US012670012B2

(12) United States Patent
Sim et al.

(10) Patent No.: US 12,670,012 B2
(45) Date of Patent: Jun. 30, 2026

(54) PROCESSOR COMPRISING CONTEXT CONTROLLER AND OPERATING METHOD THEREOF

(71) Applicant: Samsung Electronics Co., Ltd., Suwon-si (KR)

(72) Inventors: Hyunwoo Sim, Suwon-si (KR); Hyunpil Kim, Suwon-si (KR); Seongwoo Ahn, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 206 days.

(21) Appl. No.: 18/422,598

(22) Filed: Jan. 25, 2024

(65) Prior Publication Data

US 2024/0264859 A1 Aug. 8, 2024

(30) Foreign Application Priority Data

Feb. 2, 2023 (KR) ........................ 10-2023-0014407

(51) Int. Cl.
*G06F 9/48* (2006.01)
*G06F 9/30* (2018.01)

(52) U.S. Cl.
CPC ........ *G06F 9/4812* (2013.01); *G06F 9/30105* (2013.01)

(58) Field of Classification Search
CPC ............... G06F 9/4812; G06F 9/30105; G06F 9/30101; G06F 9/30116; G06F 9/3013; G06F 9/462; G06F 13/24; G06F 13/1673; G06F 9/30094; G06F 9/3012; G06F 9/3863
See application file for complete search history.

(56) References Cited

U.S. PATENT DOCUMENTS

| | | | |
|---|---|---|---|
| 4,851,991 A | 7/1989 | Rubinfeld et al. | |
| 5,812,868 A | 9/1998 | Moyer et al. | |
| 6,243,804 B1 * | 6/2001 | Cheng ................. | G06F 9/30123 |
| | | | 712/228 |
| 6,292,888 B1 * | 9/2001 | Nemirovsky ....... | G06F 9/30123 |
| | | | 711/149 |

(Continued)

FOREIGN PATENT DOCUMENTS

| | | |
|---|---|---|
| EP | 0 955 583 A2 | 11/1999 |
| WO | WO-2021/107173 A1 | 6/2021 |

OTHER PUBLICATIONS

Extended European Search Report dated Jul. 1, 2024 issued in European Patent Application No. 24155338.7-1203.

*Primary Examiner* — Farley Abad
(74) *Attorney, Agent, or Firm* — Harness, Dickey & Pierce, P.L.C.

(57) ABSTRACT

A processor includes a register file, a context controller that, in response to a target interrupt occurring, is configured to determine, a target register that stores new data acquired through each of commands for executing an interrupt service routine (ISR) among the plurality of registers, a write buffer configured to transmit pre-data stored in the target register to a memory, and a flag register configured to store set data including set values indicating whether the new data is stored in each of the registers. The context controller is configured to determine whether to transfer the pre-data to the memory through the write buffer based on the set data.

20 Claims, 17 Drawing Sheets

(56) References Cited

U.S. PATENT DOCUMENTS

| | | | |
|---|---|---|---|
| 7,529,915 B2 | 5/2009 | Gelinas et al. | |
| 7,689,748 B2 | 3/2010 | Grossman et al. | |
| 9,817,664 B2 | 11/2017 | Ron et al. | |
| 9,965,281 B2 | 5/2018 | Abdallah | |
| 11,138,011 B2 | 10/2021 | Menyhart | |
| 2003/0051124 A1 | 3/2003 | Dowling | |
| 2006/0149940 A1* | 7/2006 | Mukherjee | G06F 9/461 |
| | | | 712/228 |
| 2006/0277396 A1* | 12/2006 | Renno | G06F 9/30043 |
| | | | 712/228 |
| 2007/0106885 A1* | 5/2007 | Rychlik | G06F 9/30101 |
| | | | 712/228 |
| 2017/0161217 A1* | 6/2017 | Im | G06F 9/30123 |
| 2017/0269856 A1* | 9/2017 | Ouyang | G11C 16/32 |

* cited by examiner

Figure 6A:
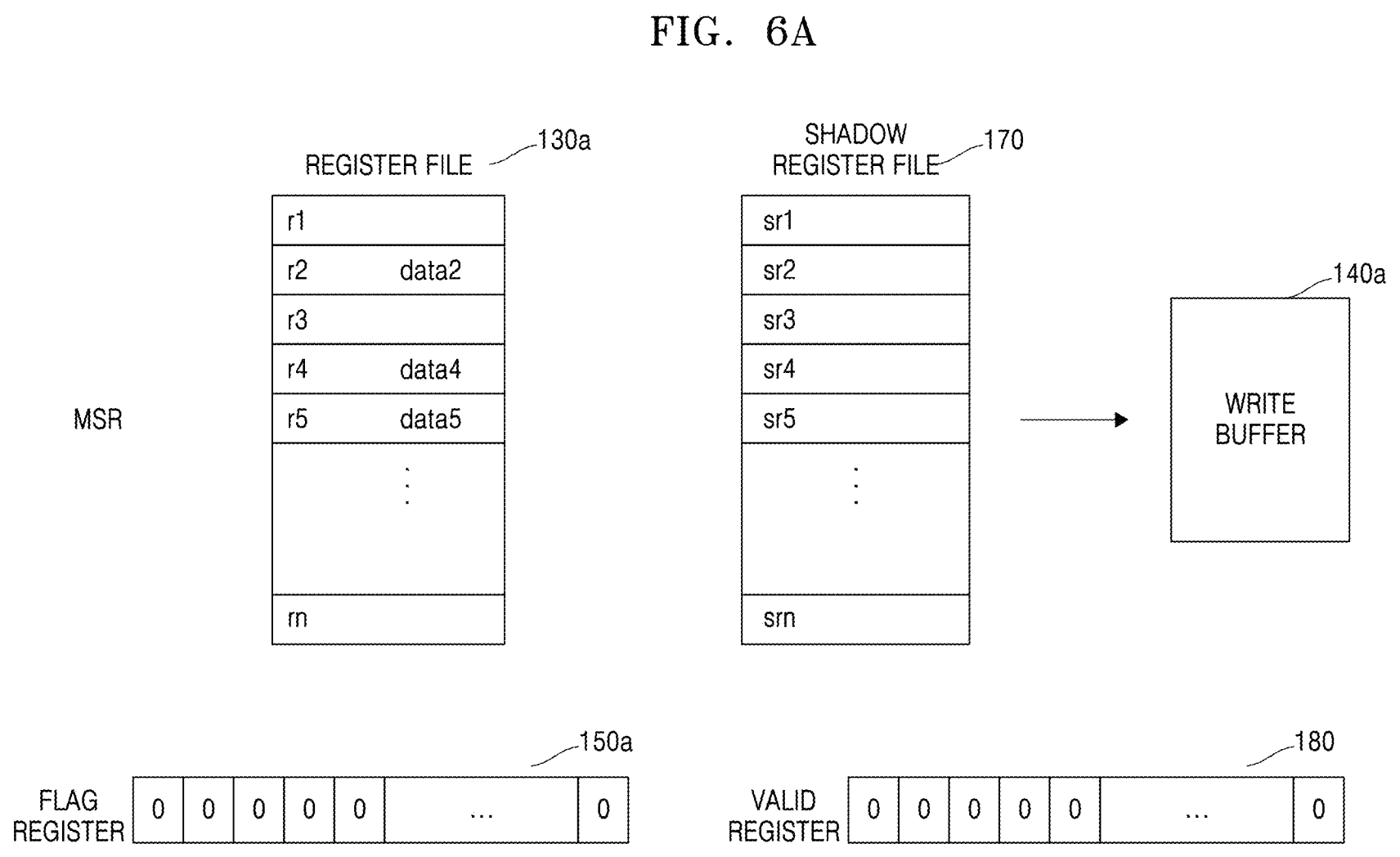

REGISTER FILE 130a

| r1 | |
|----|----|
| r2 | data2 |
| r3 | |
| r4 | data4 |
| r5 | data5 |
| | . . . |
| rn | |

MSR

FLAG REGISTER 150a

| 0 | 0 | 0 | 0 | . . . | 0 |
|---|---|---|---|---|---|

SHADOW REGISTER FILE 170

| sr1 | |
|-----|----|
| sr2 | |
| sr3 | |
| sr4 | |
| sr5 | |
| | . . . |
| srn | |

WRITE BUFFER 140a

VALID REGISTER 180

| 0 | 0 | 0 | 0 | 0 | . . . | 0 |
|---|---|---|---|---|---|---|

FIG. 10

PROCESSOR COMPRISING CONTEXT CONTROLLER AND OPERATING METHOD THEREOF

CROSS-REFERENCE TO RELATED APPLICATION

This application is, based on and claims priority under 35 USC § 119 to Korean Patent Application No. 10-2023-0014407, filed on Feb. 2, 2023, in the Korean Intellectual Property Office, the disclosure of which is incorporated by reference herein in its entirety.

BACKGROUND

Various example embodiments relate to a processor, and more particularly, to a processor executing an interrupt service routine and/or an operating method thereof.

A processor may execute a program including commands. When an interrupt occurs while a program is running, the processor may first execute a processing operation based on the interrupt. For example, when an interrupt occurs, the processor may stop or halt processing of a main service routine (MSR) and may process the interrupt service routine. The processor may use an internal register to process the interrupt service routine.

When the interrupt service routine is terminated, the service routine executed before the interrupt service routine needs to be or is expected to be re-executed. In order to re-execute the previously executed service routine, the processor processes the interrupt service routine after storing the data stored in all registers in a memory. When the interrupt service routine is terminated, the processor may restore the data stored in the memory back to all registers. Because the processor stores all data stored in all registers in the memory and restores the data stored in the memory to the registers, context switching overhead or thrashing may occur.

As a result, there is a need or a desire for a method of reducing the processing time of an interrupt service routine.

SUMMARY

Various example embodiments provide a processor and/or an operating method thereof that reduce context switching overhead by transferring data stored in a register to a memory using a write buffer.

According to some example embodiments, there is provided a processor including a register file including a plurality of registers configured to store data, a context controller that, in response to a target interrupt occurring, is to determine a target register that stores new data acquired through each of commands among the plurality of registers based on each of the commands for executing an interrupt service routine (ISR) for the target interrupt, and to store the new data in the target register, a write buffer configured to transfer pre-data stored in the target register to a memory, and a flag register configured to store set data including set values indicating whether the new data is stored in each of the plurality of registers. The context controller is configured to determine whether to transfer the pre-data to the memory through the write buffer, based on the set data.

Alternatively or additionally according to various example embodiments, there is provided a processor including a register file including a plurality of registers that are configured to store data, a shadow register file including shadow registers respectively corresponding to the plurality of registers, a context controller that, in response to a target interrupt ring, is configured to store new data acquired through each of commands for executing a target interrupt service routine (ISR) in a target register corresponding to each of the commands among the plurality of registers, and a write buffer configured to transfer first pre-data stored in a target shadow register corresponding to the target register to a memory. The context controller is configured to determine whether to store second pre-data, that is stored in the target register, in the target shadow register based on set data indicating whether the new data is stored in the target register, and to determine whether to transfer the first pre-data to the memory through the write buffer, based on the set data and valid data indicating whether the first pre-data is stored in the target shadow register.

Alternatively or additionally according to some example embodiments, there is provided an operating method of a processor including a plurality of registers and a plurality of shadow registers, the method including in response to a target interrupt occurs, receiving a command for executing a target interrupt service routine and determining a target register storing new data acquired through the command among the plurality of registers, transferring the first pre-data stored in the target shadow register to the memory through a write buffer based on whether new data acquired in advance through the target interrupt service routine is stored in the target register and whether first pre-data is stored in a target shadow register corresponding to the target register, storing second pre-data, that is stored in the target register, in the target shadow register based on whether new data acquired in advance through the target interrupt service routine is stored in the target register, storing the new data in the target register, restoring the second pre-data stored in at least one of the plurality of shadow registers to at least one of the plurality of registers, when the target interrupt service routine is terminated, and restoring the first pre-data stored in the memory to at least one of the plurality of shadow registers, while a service routine executed before execution of the target interrupt service routine is executed again.

BRIEF DESCRIPTION OF THE DRAWINGS

Various example embodiments will be more clearly understood from the following detailed description taken in conjunction with the accompanying drawings in which:

FIG. 2 is a block diagram illustrating a processor according to some example embodiments;

FIG. 5 is a block diagram illustrating a processor according to some example embodiments;

FIG. 6A is a diagram illustrating an MSR according to some example embodiments;

FIG. 10 is a diagram illustrating an application processor according to some example embodiments;

DETAILED DESCRIPTION OF VARIOUS EXAMPLE EMBODIMENTS

Hereinafter, some example embodiments are described in detail with reference to the accompanying drawings.

As used herein, the term processor or processor system may refer to one processor that performs the defined functions or a plurality of processors that collectively perform the defined functions such that the execution of the individual defined functions may be divided amongst such processors. The one processor or the plurality of processors may be single-core processors, or processors having a plurality of cores, such as dual-core processors, or quad-core processor. The plurality of processors may be packaged on the same chip and/or different chips. The plurality of processors may be packaged on the same board and/or on different boards. The plurality of processors may be packaged on the same electronic devices and/or on different electronic devices. Example embodiments are not limited thereto.

Figure 1:
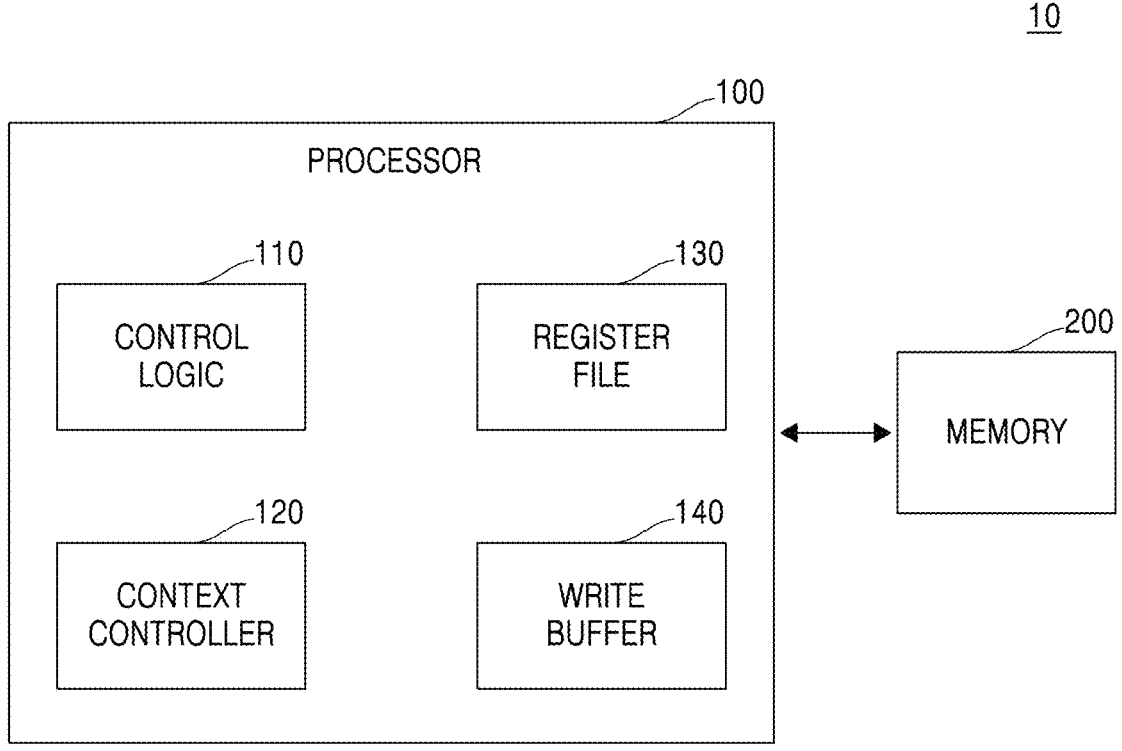
FIG. 1 illustrates a processor system according to some example embodiments.

FIG. 1 illustrates a processor system 10 according to some example embodiments.

Referring to FIG. 1, the processor system 10 may include a processor 100 and a memory 200. The processor 100 may perform a certain task, commands, instructions, or operations.

In some example embodiments, the processor 100 may be implemented as one or more of a general-purpose processor, a dedicated processor, or an application processor. In some example embodiments, the processor 100 may be implemented as one or more of a computational processor (e.g., a central processing unit (CPU), graphics processing unit (GPU), an application processor, and the like) including dedicated logic circuits (e.g., field programmable gate arrays (FPGAs), application specific integrated circuits (ASICs), and the like) but is not limited thereto.

The processor 100 may execute a program, e.g., a program that has machine-readable instructions listed therein. A program stored in a storage (not shown) outside the processor system 10 may be executed in the memory 200. The program may include a main service routine (MSR). The MSR may include commands for executing the MSR. The processor 100 may sequentially process the commands included in the MSR. An interrupt may occur while the processor 100 is executing the MSR. For example, an interrupt may occur in one or more of external devices, such as one or more of disks, keyboards, printers, and display devices. When an interrupt occurs, the processor 100 may temporarily suspend or halt the processing MSR and may execute an interrupt service routine corresponding to the interrupt that occurs. An interrupt service routine may include commands for executing the interrupt service routine. Additionally, another interrupt may occur while the processor 100 is executing one interrupt service routine, and the processor 100 may also execute another interrupt service routine.

According to a comparative example, the processor 100 may back up data of a register file 130 to the memory 200 before executing the interrupt service routine. When the processor 100 executes the interrupt service routine, it is necessary or desirable to write data to a register included in the register file 130, while processing the commands included in the interrupt service routine. To maintain data written to the register while executing the MSR, the processor 100 may back up the data of the register to the memory 200 before executing the interrupt service routine. Because the processor 100 backs up the data stored in all registers to the memory 200, it may take a lot of time before processing the interrupt service routine.

When an interrupt occurs, the processor 100 according to various inventive concepts may execute an interrupt service routine without backing up the data stored in the register to the memory 200. The processor 100 may back up data stored in a target register, while executing an interrupt service routine. Accordingly, the time required or used to execute the interrupt service routine may be reduced. When the interrupt service routine is executed, the processor 100 may receive a command to execute the interrupt service routine.

The processor 100 may include a control logic 110, a context controller 120, the register file 130, and a write buffer 140. However, the processor 100 is not necessarily limited thereto, and components of the processor 100 may be further added thereto as needed. The control logic 110 may control execution of an operation corresponding to each of the commands included in the MSR. The control logic 110 may control execution of an operation corresponding to each of the commands included in the interrupt service routine. In some example embodiments, the control logic 110 may receive a decoded command and control execution of an operation corresponding to the command. For example, the control logic 110 may control at least one of the components of the processor 100 so as to adjust a stack pointer for the memory 200 when an interrupt occurs. When an interrupt occurs, the processor 100 may secure or help secure a storage space of the memory 200 in advance by adjusting the stack pointer. Alternatively or additionally, the control logic 110 may control performance of a certain arithmetic operation by controlling an arithmetic logic unit (ALU) (not shown).

The context controller 120 may receive one or more commands. When a target interrupt occurs, the context controller 120 may receive commands of a target interrupt service routine without first storing data stored in the register file 130 in the memory 200. When the target interrupt occurs, the context controller 120 may determine a target register based on each of commands for executing the target interrupt service routine. The target interrupt service routine may refer to an interrupt service routine that the processor 100 currently intends to process.

The target register may indicate or refer to a register to which data is to be written among a plurality of registers in each of the commands of the target interrupt service routine. New data acquired through each of the commands of the target interrupt service routine may be stored in the target register. New data may indicate or refer to data to be written to a register according to the commands of the target interrupt service routine. For example, according to a first command of the target interrupt service routine, a calculation logic of the processor 100 may generate new data by performing a calculation operation. The context controller 120 may store the new data in the target register. Storing data in the register by the context controller 120 may indicate or refer to controlling a register to store data therein and/or controlling at least one of components of the processor 100 to store data in a register.

The target interrupt service routine may include a plurality of commands. The commands may be executed sequentially; example embodiments are not necessarily limited thereto. Regarding each of the commands, the context controller 120 may sequentially determine target registers respectively corresponding to the commands. The context controller 120 may determine a target register corresponding to a command to write data to the register file 130, among the commands. For example, the commands of the target interrupt service routine may include a first command to write first data to a first register, a second command to write second data to a second register, and a third command to write third data to a third register. The first command, the second command, and the third command may be processed in the order listed. The new data may be first data, second data, and third data. The context controller 120 may determine a target register corresponding to the first command as the first register. The context controller 120 may determine a target register corresponding to the second command as the second register. The context controller 120 may determine a target register corresponding to the third command as the third register. The context controller 120 may not determine a target register corresponding to a command other than a command to write data to the register file 130, among the commands.

The register file 130 may include a plurality of registers, e.g., of memory registers. For example, the register file 130 may include dozens, scores, or hundreds of registers. However, example embodiments are not necessarily limited thereto, and the number of registers included in the register file 130 may vary. Additionally or alternatively, the processor 100 may include various types and numbers of registers according to the purpose, performance, and size of the processor 100. For example, the processor 100 may include at least one of a program counter register, a stack pointer register, and a program status register.

The write buffer 140 may transfer pre-data stored in the target register to the memory 200. The pre-data may indicate or refer to data stored in a target register. For example, when a target interrupt service is executed, while the MSR is being executed, data stored in the target register when the MSR is executed may be pre-data. The write buffer 140 may transfer data transferred to the write buffer 140 to the memory 200 when the memory 200 does not perform a memory operation.

In order to store new data acquired through the target interrupt service routine in the target register, pre-data already stored in the target register needs to be separately stored before the new data is stored in the target register. For example, the pre-data may be stored in the memory 200 through the write buffer 140 and new data may be stored in the target register. The pre-data may be stored in a shadow register (not shown), and the pre-data stored in the shadow register may be stored in the memory 200 through the write buffer 140.

Target registers respectively corresponding to the commands for executing one interrupt service routine may overlap each other. In the same interrupt service routine, if new data for a command executed later needs to be or is desired to be stored in the target register in a state in which new data for a command executed earlier is stored in the target register, the new data for the command executed earlier does not correspond to data generated in a previous service routine, and thus, the new data for the command executed earlier may not need to be or may not be required or expected to be stored in the memory 200. For example, if second new data for a second command executed later than the first command is stored in the first register in a state in which first new data for the first command is stored in the first target register, the first new data may not be stored in the memory 200.

The context controller 120 may determine whether to transfer pre-data to the memory 200 through the write buffer 140 based on whether new data is stored in each of the registers. For example, the context controller 120 may transfer the pre-data to the write buffer 140 based on whether new data due to execution of the target interrupt service routine is stored in each of the registers within the target interrupt service routine. For example, it may be assumed that the target interrupt service routine includes a first command and a second command and a target register of the first command is the first register. The context controller 120 may determine a target register of the second command as the first register based on the second command of the target interrupt service routine. Because the first new data for the first command is stored in the first register, the context controller 120 may not transfer the first new data that is pre-data stored in the first register to the write buffer 140. As another example, it may assumed that the target register of the first command of the target interrupt service routine is the first register. The context controller 120 may determine a target register of the third command as the third register based on the third command of the target interrupt service routine. Because new data is not stored in the third register, the context controller 120 may store pre-data stored in the third register in the memory 200 through the write buffer 140. The context controller 120 may store new data for the third command in the third register.

The memory 200 may store data used when the processor 100 executes a program. In some example embodiments, the memory 200 may be a volatile memory. The memory 200 may be implemented as a cache, and for example, the processor 100 may use cache data stored in the cache when executing a program. The memory 200 may include at least one of dynamic random access memory (DRAM), synchronous DRAM (SDRAM), double data rate SDRAM (DDR SDRAM), low power double data rate SDRAM (LPDDR SDRAM), graphics double data rate SDRAM (GDDR SDRAM), Rambus® DRAM (RDRAM) and static RAM (SRAM).

When a target interrupt occurs, the processor 100 may execute a target interrupt service routine and may store new data in a target register as commands of the target interrupt service routine are processed. As the commands of the target interrupt service routine are processed, the new data may be stored in the target register in real time, and because only data stored in the target register is backed up by determining the target register necessary for or used for the commands of the target interrupt service routine to be processed, interrupt processing may be performed rapidly or more rapidly. Alternatively or additionally, because data is stored in the memory 200 using the write buffer, path confusion due to data not being stored in the memory 200 within a short period of time may be prevented from occurring.

Any or all of the elements described with reference to FIG. 1 may communicate with any or all other elements described with reference to FIG. 1. For example, any element may engage in one-way and/or two-way and/or broadcast communication with any or all other elements in FIG. 1, to transfer and/or exchange and/or receive information such as but not limited to data and/or commands, in a manner such as in a serial and/or parallel manner, via a bus such as a wireless and/or a wired bus (not illustrated). The information may be in encoded various formats, such as in an analog format and/or in a digital format.

Figure 2:
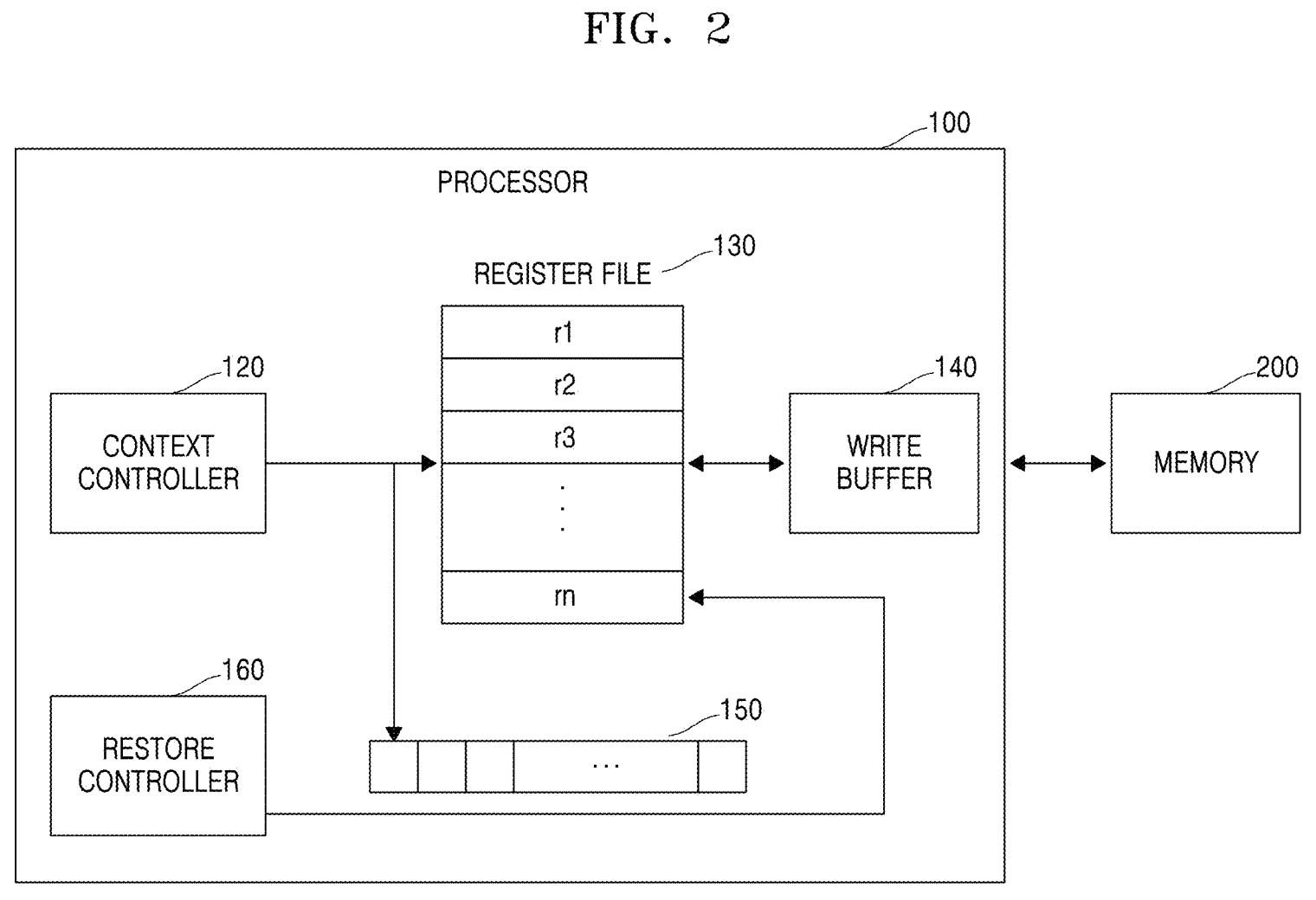

FIG. 2 is a block diagram illustrating the processor 100 according to some example embodiments. The processor 100, the context controller 120, the register file 130, and the write buffer 140 of FIG. 2 correspond to the processor 100, the context controller 120, the register file 130, and the write buffer of FIG. 1, and thus, redundant descriptions thereof are omitted.

Referring to FIG. 2, the processor 100 may include the context controller 120, the register file 130, the write buffer 140, a flag register 150, and a restore controller 160. The register file 130 may include a plurality of registers r1 to rn (or first to n-th registers). The register file 130 may include n (n is a positive number, e.g., a positive integer) registers. Each of the registers r1 to rn may store data.

The flag register 150 may store set data including set values. The set values may correspond to the registers r1 to rn, respectively, and may indicate whether new data is stored in each of the registers r1 to rn. For example, the set data may include a first set value, a second set value, . . . , an n-th set value. The first set value may indicate whether new data is stored in the first register r1. The second set value may indicate whether new data is stored in the second register r2. The set data may be represented by register bits. The number of register bits of the flag register 150 may be n. Each register bit may indicate a set value.

The flag register 150 may store a set value according to whether new data is stored in each of the registers r1 to rn. Specifically, the context controller 120 may control the flag register 150 to store a set value according to whether new data is stored in each of the registers r1 to rn. When an interrupt service routine is executed, a register value of the flag register 150 may be initialized. For example, when an interrupt service routine is executed, set values of the flag register 150 may be initialized. When the set values of the flag register 150 are initialized, the set values may be a second value. All register bits of the flag register 150 may be the second value.

When new data is stored in a target register, the context controller 120 may store a set value corresponding to the target register as a first value in the flag register 150. For example, the context controller 120 may store first new data in the first register r1 and store a first set value corresponding to the first register in the flag register 150 as the first value. When the first set value is the second value before the first new data is stored, the first set value may be changed from the second value to the first value. When the first set value is the first value before the first new data is stored, the first set value may be maintained as the first value.

In some example embodiments, the first value may be different from the second value. The first value may be opposite to the second value. For example, the first value may be 1 and the second value may be 0. However, example embodiments are not necessarily limited thereto. For example, the first value may be 0 and the second value may be 1.

The context controller 120 may determine whether to transfer pre-data to the memory 200 through the write buffer 140 based on the set data. The context controller 120 may determine whether to transfer pre-data stored in the target register to the memory 200 through the write buffer 140 based on the set value corresponding to the target register. When the context controller 120 is to store new data in the target register, if pre-data is stored in the target register, it is necessary or desirable to separately store the pre-data. When the new data is stored in the target register, the context controller 120 may determine whether to transfer the pre-data to the memory through the write buffer 140 based on the set data and store the new data in the target register.

When the new data is stored in the target register, if the set value corresponding to the target register is the first value, the context controller 120 may determine not to transfer the pre-data stored in the target register to the memory 200 through the write buffer 140 and not to store the new data in the target register. For example, the context controller 120 may overwrite the target register with the new data.

When the new data is stored in the target register, if the set value corresponding to the target register is the second value, the context controller 120 may determine to transfer the pre-data stored in the target register to the write buffer 140 and to store the new data in the target register. In some example embodiments, the pre-data may be stored in a stack region of the memory 200 through the write buffer 140. The context controller 120 may transfer the pre-data and an address to the write buffer 140. The address may be represented by a stack pointer and a register index value. For example, the context controller 120 may determine the address of the stack region to store the pre-data by adding the stack pointer and the register index value thereto.

When the target interrupt service routine is terminated, the restore controller 160 may restore the pre-data stored in the register file 130 before the target interrupt service routine is executed. While the interrupt service routine is being executed, all of or at least a portion of the pre-data stored in the register file 130 may be stored in the memory 200. When the interrupt service routine is terminated, the pre-data stored in the memory 200 may be restored to an original location of the register file 130, while the interrupt service routine is being executed.

When the target interrupt service routine is terminated, the restore controller 160 may restore the pre-data from the memory 200 to the register file 130 based on the set data. The restore controller 160 may restore the pre-data from the memory 200 to the register file 130 based on the set value that is the first value of the set data. The operation of the restore controller 160 is described below in detail with reference to FIG. 4.

Figure 3A:
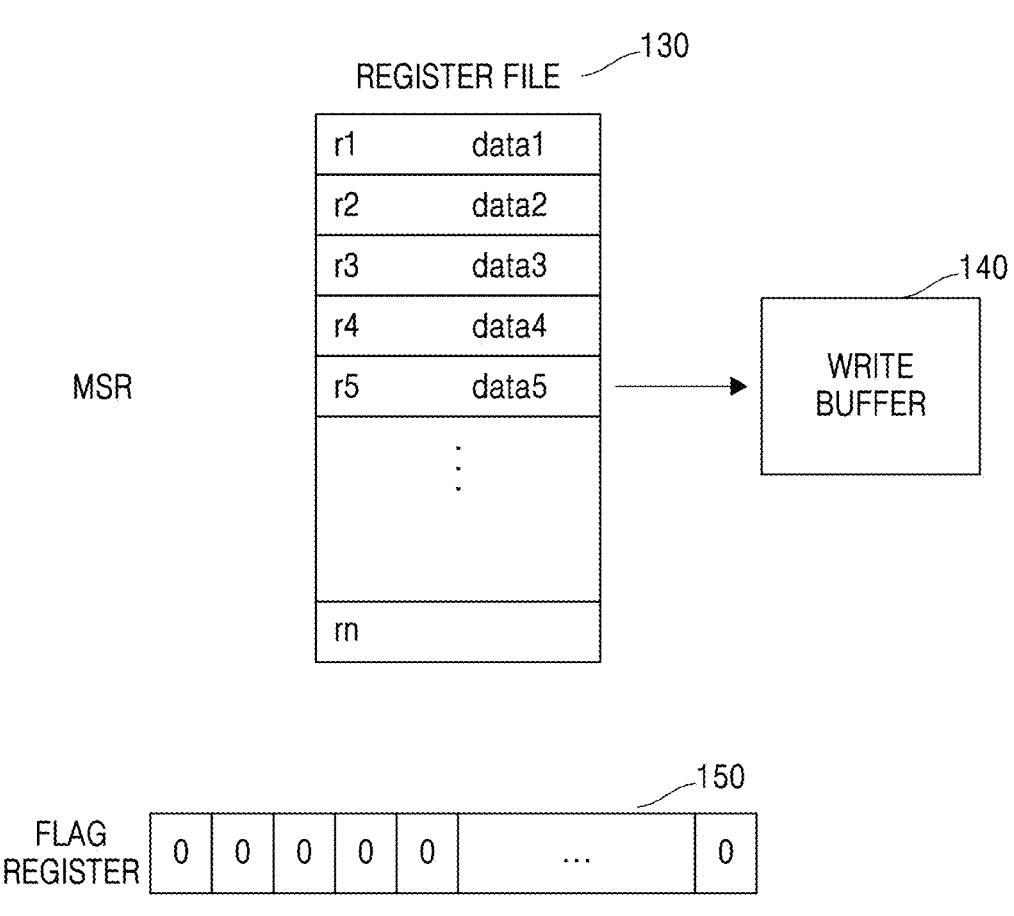
FIG. 3A is a diagram illustrating a main service routine (MSR) according to some example embodiments.

FIG. 3A is a diagram illustrating an MSR according to some example embodiments. Hereinafter, descriptions are given with reference to FIGS. 2 and 3A together.

The processor 100 may execute the MSR. Data generated while the MSR is executed may be stored in the register file 130. The register file 130 may include a plurality of registers. Data may be stored in a register necessary for the MSR to be executed. For example, while the MSR is executed, third data data3 may be stored in the third register r3, fourth data data4 may be stored in the fourth register r4, and fifth data data5 may be stored in the fifth register r5.

An interrupt may occur while the MSR is running. When an interrupt occurs, the processor 100 may stop the MSR and execute an interrupt service routine. When an interrupt occurs, the context controller 120 may initialize the flag register 150. All set values of the flag register 150 may be initialized. For example, all set values of the flag register 150 may be stored as the second value. A first interrupt may occur, while the MSR is being executed. The first interrupt may be a target interrupt. A case in which a first interrupt service routine is executed is described with reference to FIG. 3B.

Figure 3B:
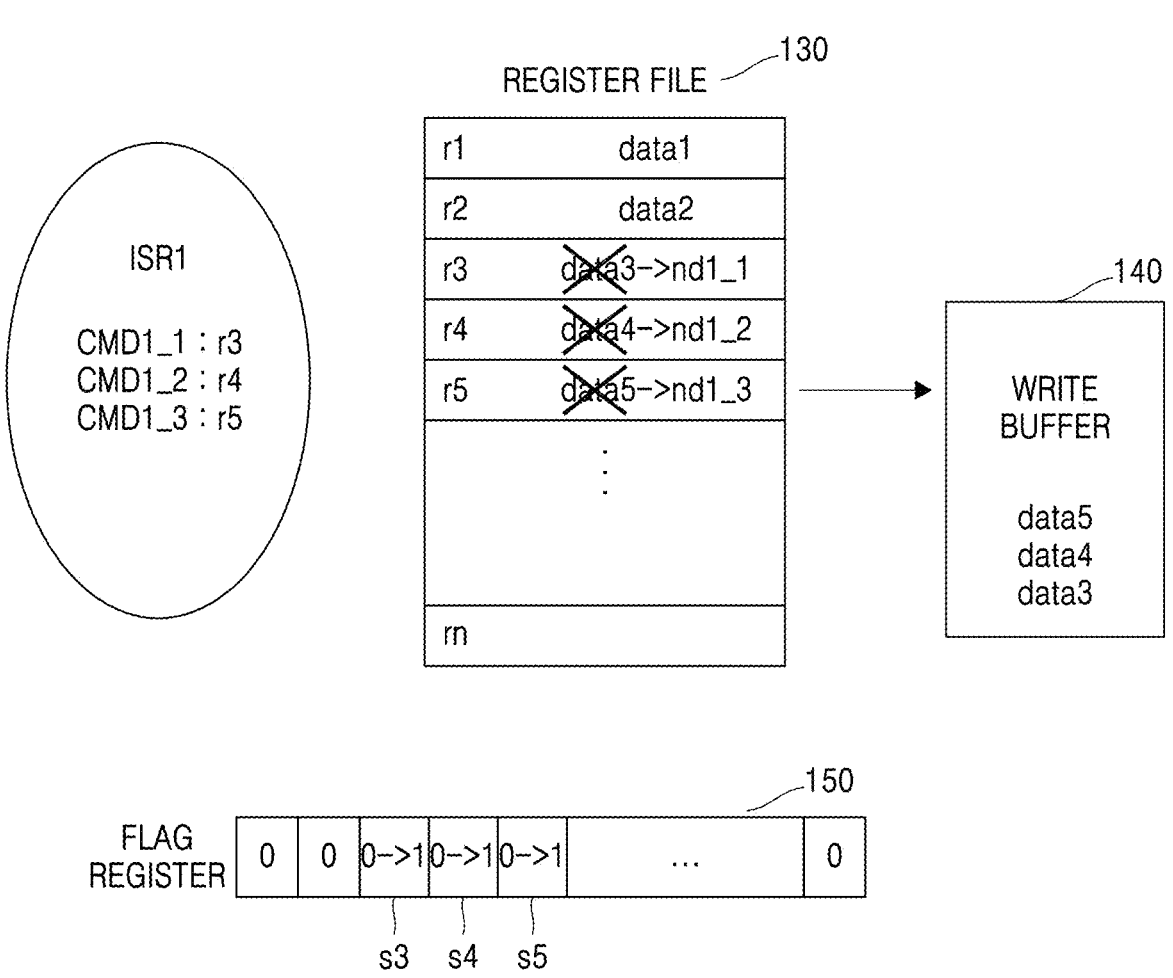
FIG. 3B is a diagram illustrating a first interrupt service routine according to some example embodiments.

FIG. 3B is a diagram illustrating the first interrupt service routine according to some example embodiments. The same descriptions as those given above are omitted.

Referring to FIGS. 2 and 3B together, the processor 100 may execute a first interrupt service routine ISR1. The first interrupt service routine ISR1 may be a target interrupt service routine. The first interrupt service routine ISR1 may include commands for executing the first interrupt service routine ISR1. The context controller 120 may receive commands. For example, the first interrupt service routine ISR1 may include a first command CMD1_1, a second command CMD1_2, and a third command CMD1_3. The context controller 120 may sequentially receive the first command CMD1_1, the second command CMD1_2, and the third command CMD1_3.

The processor 100 may execute the first command CMD1_1. The context controller 120 may determine a target register based on each of the commands for executing the first interrupt service routine ISR1. The context controller 120 may determine the third register r3 as a target register for the first command CMD1_1 based on the first command CMD1_1. The context controller 120 may store first new data nd1_1, which is or includes new data for the first command CMD1_1, in the third register r3.

The context controller 120 may determine whether to transfer pre-data to the memory 200 through the write buffer 140 based on the set data. The pre-data stored in the third register r3 may be or may include the third data data3. The context controller 120 may determine whether to transfer the third data data3 to the memory 200 through the write buffer 140 based on the third set value s3 corresponding to the third register r3.

When the set value corresponding to the target register is the second value, the context controller 120 may transfer the pre-data stored in the target register to the write buffer 140. Because the flag register 150 is in an initialized state, the third set value s3 corresponding to the third register r3 may be the second value. For example, because the third set value s3 is 0, the context controller 120 may transfer the third data data3 to the write buffer 140.

The context controller 120 may transfer the third data data3 to the write buffer 140 and store the first new data nd1_1 in the third register r3. When new data is stored in the target register, the context controller 120 may store a set value corresponding to the target register, as a first value, in the flag register 150. The context controller 120 may store the third set value s3 as the first value in the flag register 150. The third set value s3 may be stored as 1.

The processor 100 may execute the second command CMD1_2. The context controller 120 may determine a target register for the second command CMD1_2 as the fourth register r4 based on the second command CMD1_2. The context controller 120 may store second new data nd1_2 that is new data for the second command CMD1_2 in the fourth register r4.

The pre-data stored in the fourth register r4 may be or may include fourth data data4. The context controller 120 may determine whether to transfer the fourth data data4 to the memory 200 through the write buffer 140 based on the fourth set value s4 corresponding to the fourth register r4. Because the fourth set value s4 is 0, the context controller 120 may transfer the fourth data data4 to the write buffer 140. The context controller 120 may transfer the fourth data data4 to the write buffer 140 and store the second new data nd1_2 in the fourth register r4. The context controller 120 may store the fourth set value s4 as 1 in the flag register 150.

The processor 100 may execute the third command CMD1_3. The context controller 120 may determine a target register for the third command CMD1_3 as the fifth register r5 based on the third command CMD1_3. The context controller 120 may store third new data nd1_3, which is new data for the third command CMD1_3, in the fifth register r5.

Pre-data stored in the fifth register r5 may be fifth data data5. The context controller 120 may determine whether to transfer the fifth data data5 to the memory 200 through the write buffer 140 based on the fifth set value s5 corresponding to the fifth register r5. Because the fifth set value s5 is 0, the context controller 120 may transfer the fifth data data5 to the write buffer 140. The context controller 120 may transfer the fifth data data5 to the write buffer 140 and store the third new data nd1_3 in the fifth register r5. The context controller 120 may set the fifth set value s5 to 1 and store the fifth set value s5 in the flag register 150.

Figure 3C:
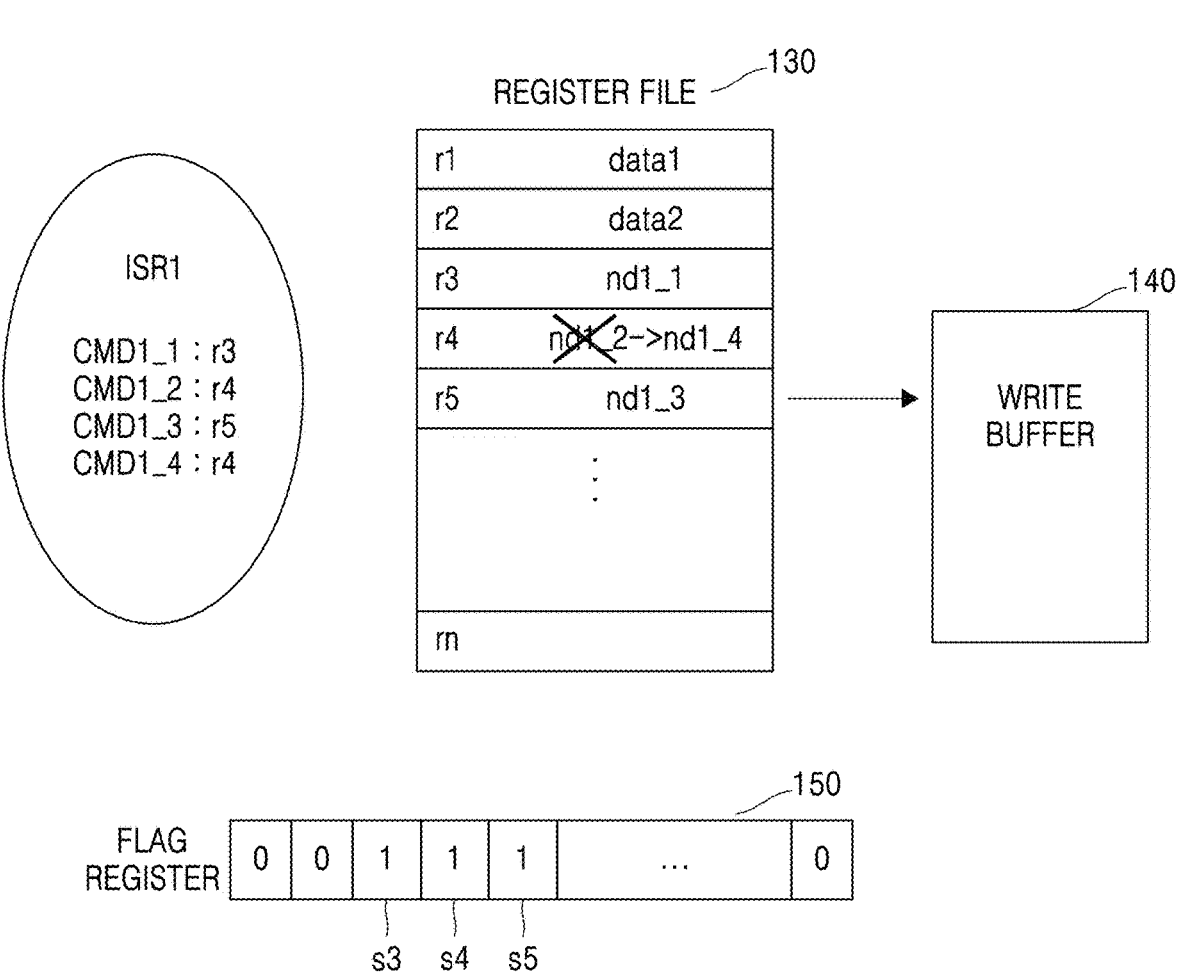
FIG. 3C is a diagram illustrating an operation of determining whether to transfer pre-data to a memory.

FIG. 3C is a diagram illustrating an operation of determining whether to transfer pre-data to a memory. FIG. 3C is a continuation of FIG. 3B, and the same descriptions as those given above are omitted.

Referring to FIGS. 2 and 3C together, the processor 100 may execute the first interrupt service routine ISR1. The first interrupt service routine ISR1 may be a target interrupt service routine. The first interrupt service routine ISR1 may execute a fourth command CMD1_4. The context controller 120 may receive the fourth command CMD1_4 following the third command CMD1_3.

The processor 100 may execute the fourth command CMD1_4. The context controller 120 may determine a target register for the fourth command CMD1_4 as the fourth register r4 based on the fourth command CMD1_4. The new data for the fourth command CMD1_4 may be fourth new data nd1_4. Pre-data stored in the fourth register r4 may be the second new data nd1_2. The context controller 120 may determine whether to transfer the second new data nd1_2 to the memory 200 through the write buffer 140 based on the fourth set value s4 corresponding to the fourth register r4.

When a set value corresponding to the target register is the first value, the context controller 120 may not transfer the pre-data stored in the target register to the write buffer 140. Because the second new data nd1_2 is stored in the fourth register r4, the fourth set value s4 may be the first value. Because the fourth set value s4 is 1, the context controller 120 may not transfer the second new data nd1_2 to the write buffer 140. The context controller 120 may store the fourth new data nd1_4 in the fourth register r4. That is, the context controller 120 may overwrite the fourth new data nd1_4 in the fourth register r4. The context controller 120 may store the fourth set value s4 as a first value in the flag register 150.

Figure 3D:
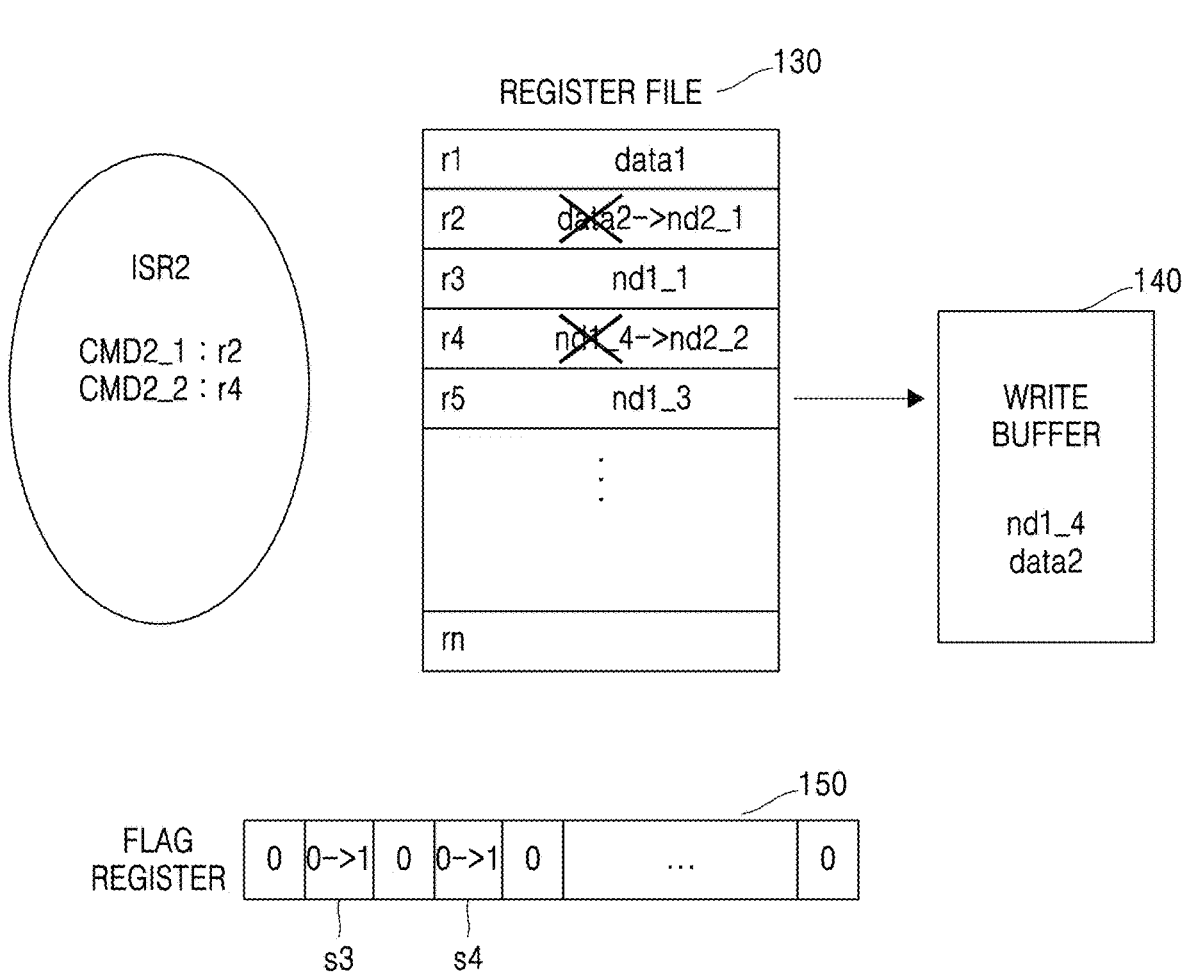
FIG. 3D is a diagram illustrating a second interrupt service routine according to some example embodiments.

FIG. 3D is a diagram illustrating a second interrupt service routine according to some example embodiments. FIG. 3D is a continuation of FIG. 3C, and the same descriptions as those given above are omitted.

While the first interrupt service ISR1 is being executed, a new interrupt may occur. A second interrupt may occur, while the first interrupt service routine ISR1 is being executed. The second interrupt may have higher priority than the first interrupt. When the second interrupt occurs, the processor 100 may stop the first interrupt service routine ISR1 and execute a second interrupt service routine ISR2. When a new interrupt occurs, the context controller 120 may store set data corresponding to a target interrupt in a memory (e.g., the memory 200 of FIG. 1) and initialize the flag register 150. When the second interrupt occurs, the context controller 120 may store set data corresponding to the first interrupt in a memory and initialize the flag register 150. For example, all set values of the flag register 150 may be stored as the second value. The second interrupt may be a target interrupt.

Referring to FIGS. 2 and 3D together, the processor 100 may execute the second interrupt service routine ISR2. The second interrupt service routine ISR2 may be a target interrupt service routine. For example, the second interrupt service routine ISR2 may include a first command CMD2_1 and a second command CMD2_2.

The processor 100 may execute the first command CMD2_1. The context controller 120 may determine a target register for the first command CMD2_1 as the second register r2 based on the first command CMD2_1. The context controller 120 may store first new data nd2_1, which is new data for the first command CMD2_1, in the second register r2. Pre-data stored in the second register r2 may be or may include the second data data2.

The context controller 120 may determine whether to transfer the second data data2 to the memory 200 through the write buffer 140 based on the second set value s2 corresponding to the second register r2. Because the flag register 150 is in an initialized state, the second set value s2 corresponding to the second register r2 may be the second value. For example, because the second set value s2 is 0, the context controller 120 may transfer the second data data2 to the write buffer 140. The context controller 120 may store the first new data nd2_1 in the second register r2. The context controller 120 may store the second set value s2 as a first value in the flag register 150.

The processor 100 may execute the second command CMD2_2. The context controller 120 may determine a target register for the second command CMD2_2 as the fourth register r4 based on the second command CMD2_2. The context controller 120 may store the second new data nd2_2, which is new data for the second command CMD2_2, in the fourth register r4.

Pre-data stored in the fourth register r4 may be fourth new data nd1_4. Because the fourth set value s4 is 0, the context controller 120 may transfer the fourth new data nd1_4 to the write buffer 140. The context controller 120 may transfer the fourth new data nd1_4 to the write buffer 140 and store the second new data nd2_2 in the fourth register r4. The context controller 120 may store the fourth set value s4 as a first value in the flag register 150.

Figure 4A:
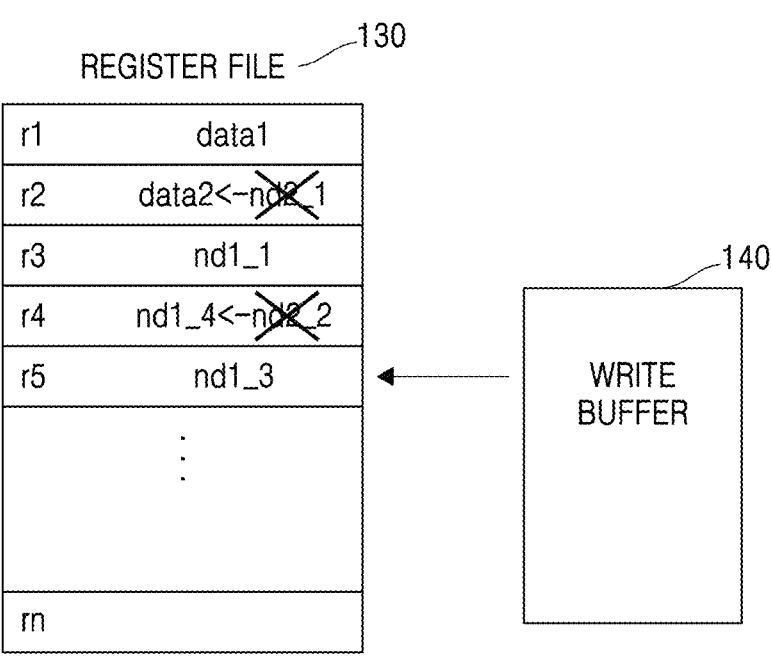
FIG. 4A is a diagram illustrating an operation of a restore controller, according to some example embodiments.
Figure 4A:
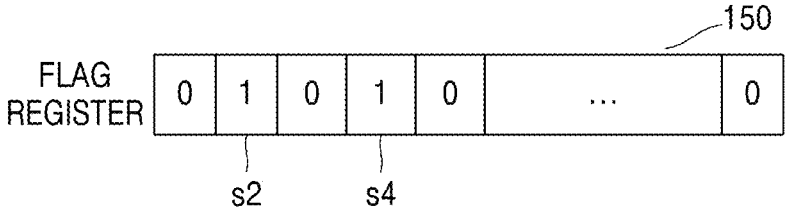

FIG. 4A is a diagram illustrating an operation of a restore controller, according to some example embodiments. Specifically, FIG. 4A is a diagram illustrating an operation of a restore controller after the second interrupt service routine is terminated. FIG. 4A is a continuation of FIG. 3D, and the same descriptions as those given above are omitted.

Referring to FIGS. 2 and 4A, when a target interrupt service routine is terminated, the restore controller 160 may restore pre-data from a memory to a register file based on set data corresponding to a target interrupt. When the second interrupt service routine is terminated, the restore controller 160 may restore pre-data based on set data corresponding to the second interrupt.

The restore controller 160 may restore the pre-data based on a set value that is the first value. The set data corresponding to the second interrupt may include a second set value s2 and a fourth set value s4 that are the first values. The restore controller 160 may restore the pre-data stored in the second register r2 and the fourth register r4 corresponding to the second and fourth set values, respectively. The restore controller 160 may restore the second data data2 and the fourth new data nd1_4 stored in the second register r2 and the fourth register r4, respectively, from the memory in the second interrupt service routine. The restore controller 160 may store the second data data2 in the second register r2 and store the fourth new data nd1_4 in the fourth register r4. When the pre-data is restored, the processor 100 may execute the first interrupt service routine from a position of the suspended first interrupt service routine.

Figure 4B:
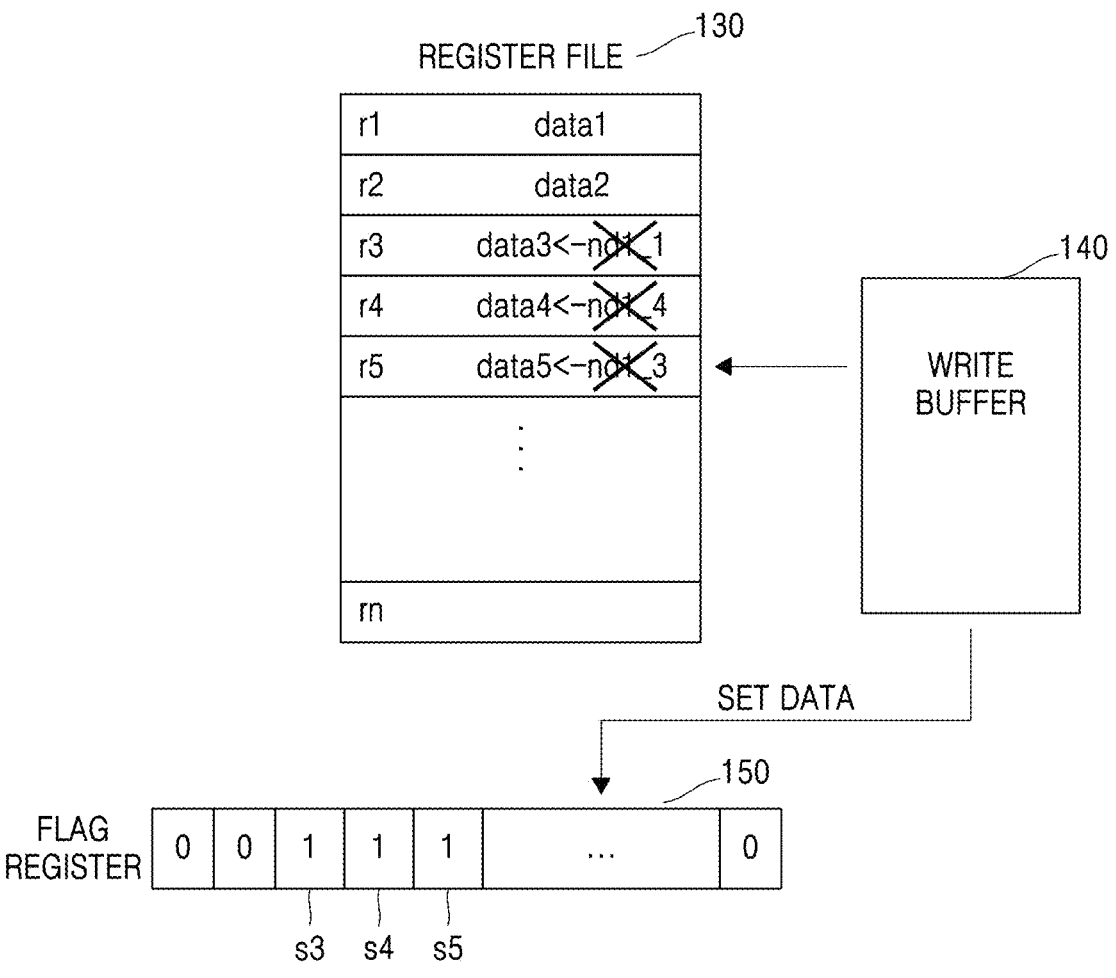
FIG. 4B is a diagram illustrating a case in which a first interrupt service routine is terminated, according to some example embodiments.

FIG. 4B is a diagram illustrating a case in which the first interrupt service routine is terminated, according to some example embodiments. In detail, FIG. 4B is a diagram illustrating an operation of a restore controller after a first interrupt service routine is terminated, according to some example embodiments. FIG. 4B is a continuation of FIG. 4A, and the same descriptions as those given above are omitted.

Referring to FIGS. 2 and 4B, when the first interrupt service routine is terminated, the restore controller 160 may restore pre-data based on set data corresponding to the first interrupt. The restore controller 160 may read set data corresponding to the first interrupt stored in the memory. The set data corresponding to the first interrupt may be stored in the flag register 150 but is not necessarily limited thereto, and the restore controller 160 may restore the pre-data by reading the set data from the memory.

The set data corresponding to the second interrupt may include the third set value s3, the fourth set value s4, and the fifth set value s5 that are the first values. The restore controller 160 may restore the pre-data stored in the third register r3, the fourth register r4, and the fifth register r5. The restore controller 160 may restore, from the memory 200, the third data data3, the fourth data data4, and the fifth data data5 stored in the third register r3, the fourth register r4, and the fifth register r5, respectively, in the first interrupt service routine. The restore controller 160 may store the third data data3 in the third register r3, the fourth data data4 in the fourth register r4, and the fifth data data5 in the fifth register r5. When the pre-data is restored, the processor 100 may execute the MSR from the position of the suspended MSR.

Figure 5:
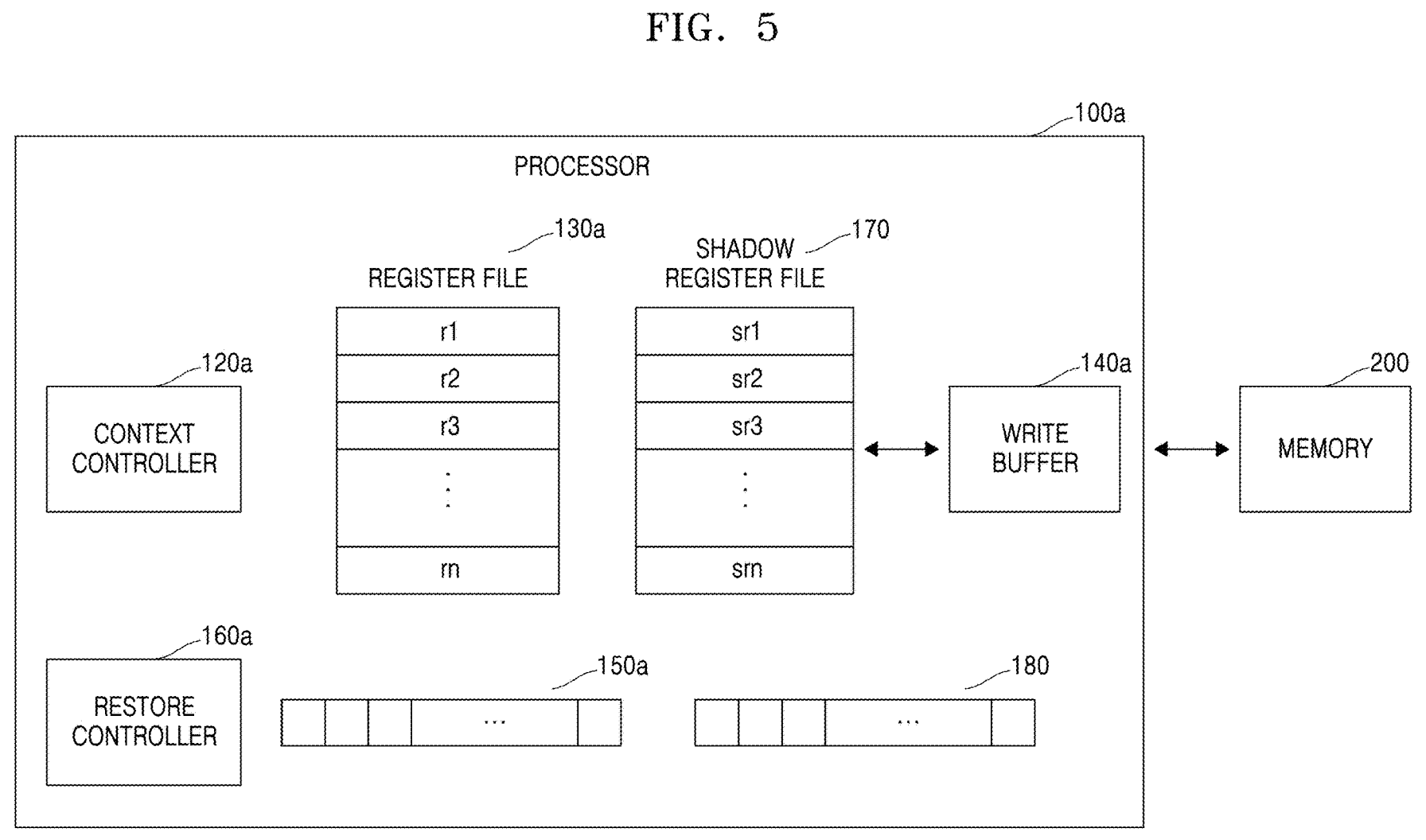

FIG. 5 is a block diagram illustrating a processor 100a according to some example embodiments. The processor 100a of FIG. 5 may be some example embodiments of the processor 100 of FIG. 1. The processor 100a, a context controller 120a, register file 130a, a write buffer 140a, a flag register 150a, and a restore controller 160a of FIG. 5 may correspond to the processor 100, the context controller 120, the register file 130, the write buffer 140, the flag register 150, and the restore controller 160, respectively. The same descriptions as those given above are omitted.

Referring to FIG. 5, the processor 100a may include the context controller 120a, the register file 130a, the write buffer 140a, the flag register 150a, the restore controller 160a, a shadow register file 170, and a valid register 180. The register file 130a may include a plurality of registers r1 to rn. The shadow register file 170 may include a plurality of shadow registers sr1 to srn. The shadow register file 170 may include n (n is a positive number, e.g., a positive integer) shadow registers. Each of the shadow registers sr1 to srn may store data. The shadow registers sr1 to srn may respectively correspond to the registers r1 to rn. For example, the first shadow register sr1 may correspond to the first register r1 and the second shadow register sr2 may correspond to the second register r2.

The valid register 180 may store valid data including valid values. The valid values may correspond to the shadow registers sr1 to srn, respectively, and indicate whether pre-data is stored in the shadow registers sr1 to srn, respectively. For example, the valid data may include a first valid value, a second valid value, . . . , an n-th valid value. The first valid value may indicate whether pre-data is stored in the first shadow register sr1. The second valid value may indicate whether pre-data is stored in the second shadow register sr2. Valid data may be represented by register bits. The number of register bits of the valid register 180 may be n. Each register bit may represent a valid value.

The context controller 120a may control the valid register 180 to store a valid value according to whether pre-data is stored in each of the shadow registers sr1 to srn. When pre-data is stored in a target shadow register, the context controller 120a may store a valid value corresponding to the target shadow register as a third value in the valid register 180. The target shadow register may refer to a shadow register corresponding to the target register. When pre-data is stored in the target shadow register, a valid value corresponding to the target shadow register may be stored as a third value. When the pre-data stored in the target shadow register is transferred to the write buffer 140a, a valid value corresponding to the target shadow register may be stored as a fourth value. The third value may be different from the fourth value. For example, the third value may be 1 and the fourth value may be 0. However, example embodiments are not necessarily limited thereto, and the third value may be 0 and the fourth value may be 1.

The context controller 120a may determine whether to store the pre-data in the target shadow register based on the set data. The context controller 120a may determine whether to store second pre-data stored in the target register in the target shadow register based on a set value corresponding to the target register. When new data is stored in the target register, the context controller 120a may determine whether to store the second pre-data in the target shadow register based on the set data and store the new data in the target register.

When new data is stored in the target register, if a set value corresponding to the target register is the first value, the context controller 120a may determine not to transfer the second pre-data stored in the target register to the target shadow register and store the new data in the target register. That is, the context controller 120a may overwrite the target register with new data.

When new data is stored in the target register, if a set value corresponding to the target register is the second value, the context controller 120a may determine that the pre-data stored in the target register is transferred to the target shadow register and store the new data in the target register. In order to transfer the pre-data stored in the target register to the target shadow register, the data stored in the target shadow register needs to be transferred to the memory 200 through the write buffer 140a. In detail, the context controller 120a may determine that the second pre-data stored in the target register is transferred to the target shadow register, and when the first pre-data is stored in the target shadow register, the first pre-data may be transferred to the write buffer 140a. The context controller 120a may determine whether the first pre-data is stored in the target shadow register based on the valid data.

When new data is stored in the target register, the context controller 120a may determine whether to transfer pre-data stored in the target shadow register to the memory through the write buffer 140a based on the set data and the valid data. The context controller 120a may determine whether to transfer the first pre-data to the memory through the write buffer 140a based on the valid data indicating whether the first pre-data is stored in the target shadow register and the set data.

When new data is not stored in the target register, the context controller 120a may determine whether to transfer pre-data stored in the target shadow register to the memory through the write buffer 140a based on the set data and on the valid data. When new data is not stored in the target register and first pre-data is stored in the target shadow register, the context controller 120a may transfer the first pre-data to the memory through the write buffer 140a. For example, when the set value corresponding to the target register is the second value and the valid value corresponding to the target shadow register is the third value, the context controller 120a may transfer the first pre-data stored in the target shadow register to the write buffer 140a. The first pre-data may be stored in the stack region of the memory 200 through the write buffer 140a. The context controller 120a may transfer the first pre-data and an address to the write buffer 140a.

When the target interrupt service routine is terminated, the restore controller 160a may restore the second pre-data stored in the register file 130a before the target interrupt service routine is executed. When the target interrupt service routine is terminated, the restore controller 160a may restore the second pre-data from the shadow register file 170 to the register file 130a based on set data corresponding to the target interrupt.

When the second pre-data is restored from the shadow register file 170 to the register file 130a, the restore controller 160a may restore the second pre-data from the memory 200 to the shadow register file 170 based on valid data and set data corresponding to a service routine executed before the target interrupt occurs. In some example embodiments, while the second pre-data is restored and an interrupt service routine for an interrupt that occurs before a target interrupt occurs, the restore controller 160 may restore the first pre-data from the memory 200 to the shadow register file 170. The operation of the restore controller 160 is described below in detail with reference to FIGS. 7A and 7B.

By restoring the pre-data from the memory 200 while the pre-data is restored and the suspended interrupt service routine is being executed, the restoration time and processing time of the interrupt service routine may be reduced.

Any or all of the elements described with reference to FIG. 5 may communicate with any or all other elements described with reference to FIG. 5. For example, any element may engage in one-way and/or two-way and/or broadcast communication with any or all other elements in FIG. 5, to transfer and/or exchange and/or receive information such as but not limited to data and/or commands, in a manner such as in a serial and/or parallel manner, via a bus such as a wireless and/or a wired bus (not illustrated). The information may be in encoded various formats, such as in an analog format and/or in a digital format.

FIG. 6A is a diagram illustrating an MSR according to some example embodiments. Hereinafter, reference is made to FIGS. 2 and 3A together.

The processor 100 may execute the MSR. For example, while the MSR MSR is executed, the third data data3 may be stored in the third register r3, the fourth data data4 may be stored in the fourth register r4, and the fifth data data5 may be stored in the fifth register r5. While the MSR is executed, a first interrupt may occur. The first interrupt may be a target interrupt. A case in which a first interrupt service routine is executed is described with reference to FIG. 6B.

Figure 6B:
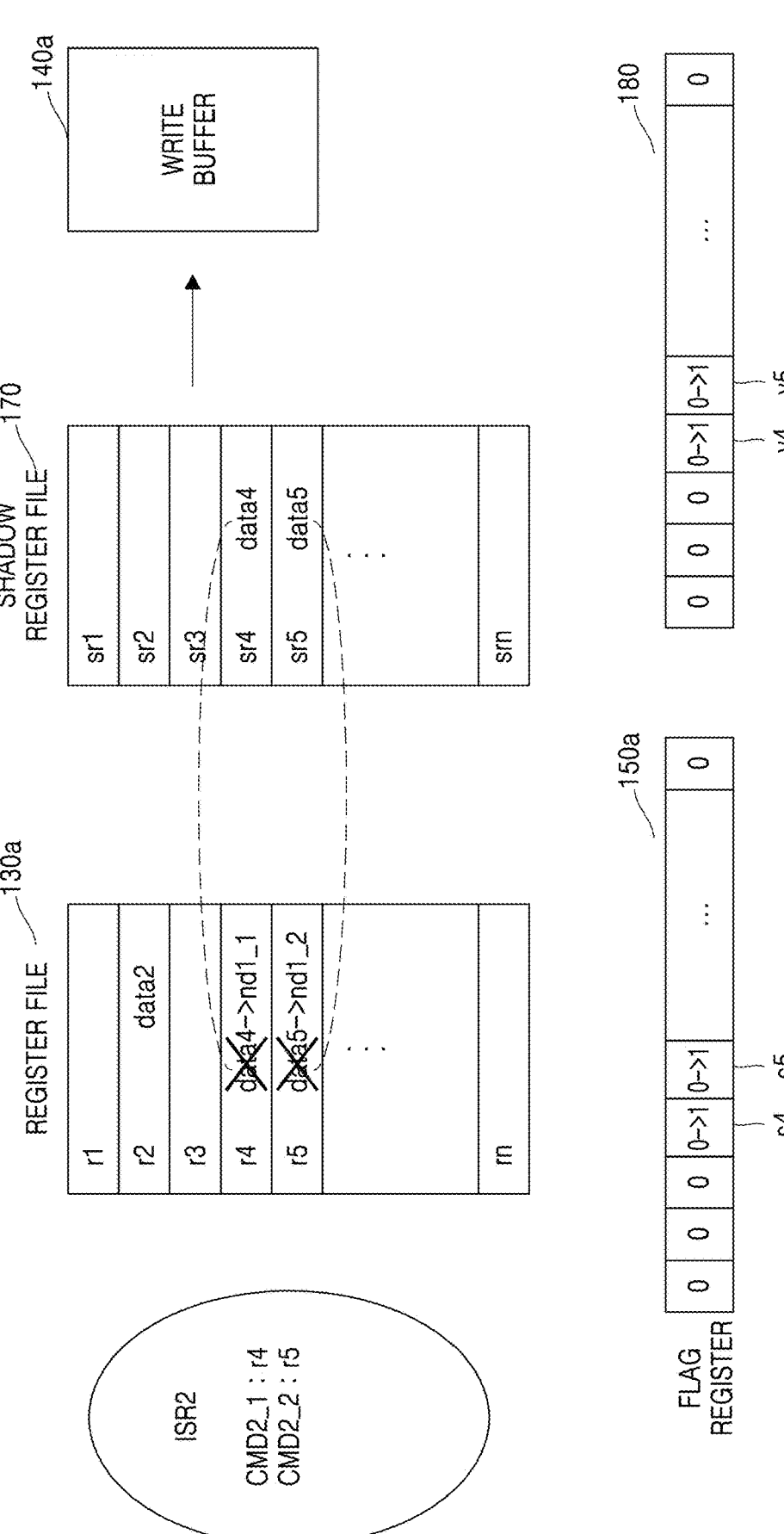
FIG. 6B is a diagram illustrating a first interrupt service routine according to some example embodiments.

FIG. 6B is a diagram illustrating the first interrupt service routine according to some example embodiments. The same descriptions as those given above are omitted.

Referring to FIGS. 5 and 6B together, the processor 100a may execute a first interrupt service routine ISR1. The first interrupt service routine ISR1 may be a target interrupt service routine. For example, the first interrupt service routine ISR1 may include a first command CMD1_1 and a second command CMD1_2.

The processor 100a may execute the first command CMD1_1. The context controller 120a may determine a target register for the first command CMD1_1 as the fourth register r4 based on the first command CMD1_1. The context controller 120a may store first new data nd1_1, which is new data for the first command CMD1_1, in the fourth register r4.

The context controller 120a may determine whether to store pre-data in a target shadow register based on set data. The context controller 120a may determine whether to store second pre-data stored in the target register in the target shadow register based on a set value corresponding to the target register. The second pre-data stored in the fourth register r4 may be the fourth data data4. The context controller 120a may determine whether to store the fourth data data4 in the fourth shadow register sr4 that is a target shadow register based on the fourth set value s4 corresponding to the fourth register r4.

When the set value corresponding to the target register is the second value, the context controller 120a may transfer the second pre-data stored in the target register to the target shadow register. Because the flag register 150a is in an initialized state, the fourth set value s4 may be the second value. For example, because the fourth set value s4 is 0, the context controller 120a may determine that the fourth data data4 is stored in the fourth shadow register r4.

In order to transfer the second pre-data stored in the target register to the target shadow register, the data stored in the target shadow register needs to be transferred to the memory through the write buffer 140a. When new data is stored in the target register, the context controller 120a may determine whether to transfer the second pre-data stored in the target shadow register to the memory through the write buffer 140a based on the set data and the valid data.

When the set value corresponding to the target register is the second value, the context controller 120a may determine whether to transfer the pre-data stored in the target shadow register to the memory through the write buffer 140a based on the valid value corresponding to the target shadow register. Because the fourth set value s4 is the second value and the fourth valid value v4 corresponding to the fourth shadow register sr4 is the fourth value, the context controller 120a may determine that there may be no stored first pre-data in the fourth shadow register sr4. Accordingly, the first pre-data may not be transferred from the fourth shadow register sr4 to the write buffer 140a. The context controller 120a may store fourth data data4 in the fourth shadow register sr4 and store first new data nd1_1 in the fourth register r4. When new data is stored in the target shadow register, the context controller 120a may store a valid value corresponding to the target shadow register as the third value in the valid register 180. The context controller 120a may store the fourth valid value v4 as the third value in the valid register 180. The fourth valid value v4 may be stored as 1. When the context controller 120a stores the first new data nd1_1 in the fourth register r4, the context controller 120a may store the fourth set value s4 as the first value in the flag register 150.

The processor 100a may execute the second command CMD1_2. The context controller 120a may determine a target register for the second command CMD1_2 as the fifth register r5 based on the second command CMD1_2. The context controller 120a may store the second new data nd1_2 that is new data for the second command CMD1_2 in the fifth register r5. The second pre-data stored in the fifth register r5 may be fifth data data5. The context controller 120a may determine whether to store the fifth data data5 in the target shadow register, the fifth shadow register sr5 that is a target shadow register, based on the fifth set value s5 corresponding to the fifth register r5.

Because the fifth set value s5 is 0, the context controller 120a may determine that the fifth data data5 is stored in the fifth shadow register r5. Because the fifth set value s5 is the second value and the fifth valid value v5 corresponding to the fifth shadow register sr5 is the fourth value, the context controller 120a may not transfer the first pre-data stored in the fifth shadow register sr5 to the write buffer 140a. The context controller 120a may store the fifth data data5 in the fifth shadow register sr5 and store the second new data nd1_2 in the fifth register r5. The context controller 120a may store the fifth valid value v5 as the third value in the valid register 180. The context controller 120a may store the fifth set value s5 as the first value in the flag register 150.

Figure 6C:
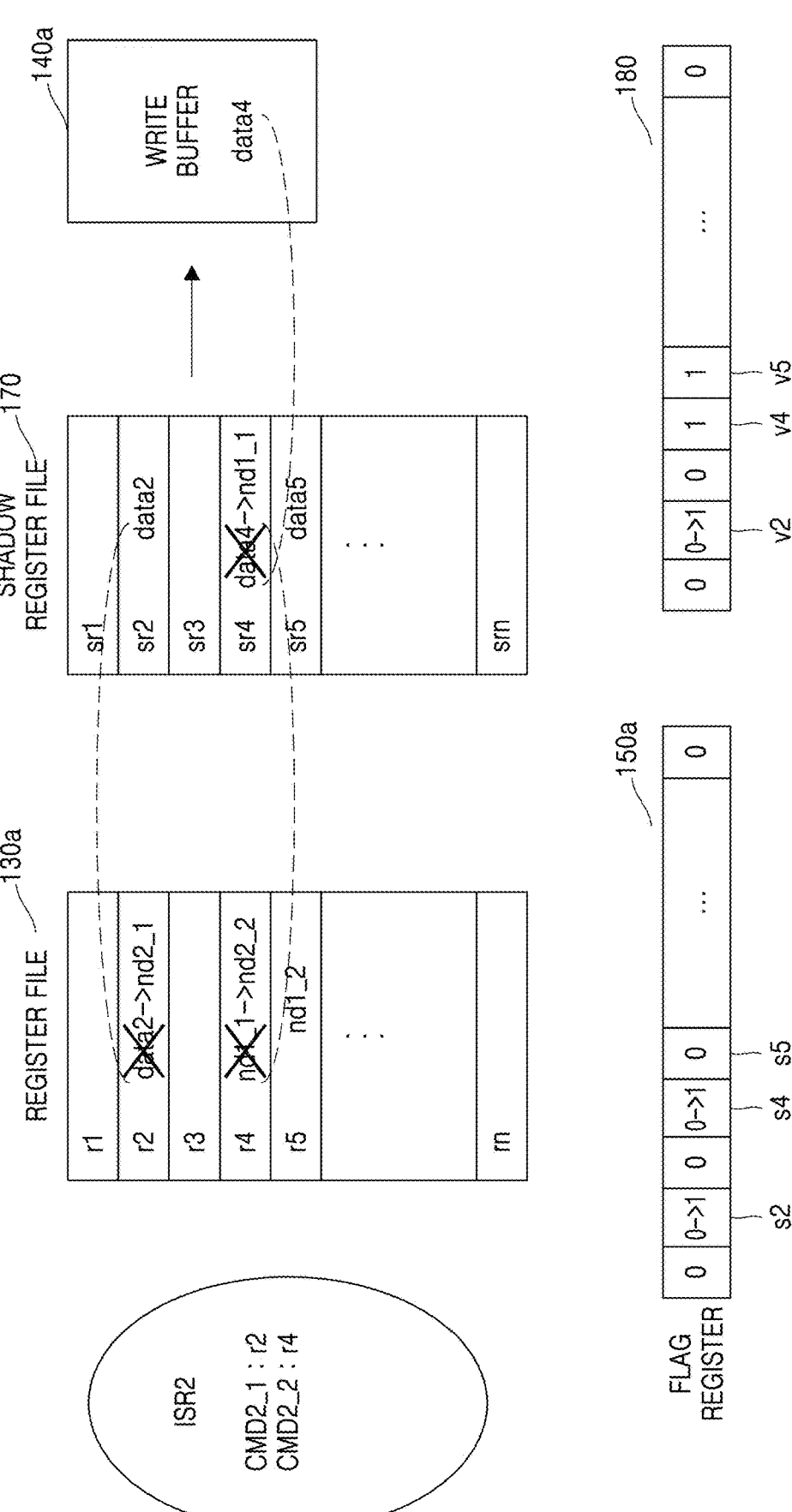
FIG. 6C is a diagram illustrating a second interrupt service routine according to some example embodiments.

FIG. 6C is a diagram illustrating a second interrupt service routine according to some example embodiments. FIG. 6C is a continuation of FIG. 6B, and the same descriptions as those given above are omitted.

When a second interrupt occurs, the processor 100a may stop the first interrupt service routine ISR1 and execute the second interrupt service routine ISR2. When the second interrupt occurs, the context controller 120a may store set data corresponding to the first interrupt in a memory and initialize the flag register 150a.

Referring to FIGS. 5 and 6C together, the processor 100a may execute the second interrupt service routine ISR2. The second interrupt service routine ISR2 may be a target interrupt service routine. For example, the second interrupt service routine ISR2 may include a first command CMD2_1 and a second command CMD2_2.

The processor 100a may execute the first command CMD2_1. The context controller 120a may determine a target register for the first command CMD2_1 as the second register r2 based on the first command CMD2_1. The context controller 120a may store first new data nd2_1, which is new data for the first command CMD2_1, in the second register r2. The second pre-data stored in the second register r2 may be the second data data2.

The context controller 120a may determine whether to store the second data data2 in the second shadow register sr2 which is a target shadow register, based on the second set value s2 corresponding to the second register r2. Because the second set value s2 is 0, the context controller 120a may determine to store the second data data2 in the second shadow register sr2.

Because the second set value s2 is the second value and the second valid value v2 corresponding to the second shadow register sr2 is the fourth value, the context controller 120a may not transfer the second pre-data to the second shadow register through the write buffer 140a. The context controller 120a may store the second data data2 in the second shadow register sr2 and store the first new data nd2_1 in the second register r2. The context controller 120a may store the second valid value v2 as a third value in the valid register 180. The context controller 120a may store the second set value s2 as a first value in the flag register 150a.

The processor 100*a* may execute the second command CMD2_2. The context controller 120*a* may determine a target register for the second command CMD2_2 as the fourth register r4 based on the second command CMD2_2. The context controller 120*a* may store second new data nd2_2, which is new data for the second command CMD2_2, in the fourth register r4. The second pre-data stored in the fourth register r4 may be the first new data nd1_1.

The context controller 120*a* may determine whether to store the first new data nd1_1 in the fourth shadow register sr4, which is a target shadow register, based on the fourth set value s4. Because the second set value s2 is 0, the context controller 120*a* may determine to store the first new data nd1_1 in the fourth shadow register sr4.

Because the fourth set value s4 is the second value and the fourth valid value v4 corresponding to the fourth shadow register sr4 is the third value, the context controller 120*a* may transfer the second pre-data stored in the fourth shadow register to the write buffer 140*a*. The second pre-data may be fourth data data4. The context controller 120*a* may transfer the fourth data data4 to the write buffer 140*a*, store the first new data nd1_1 in the fourth shadow register sr4, and transfer the second new data nd2_2 to the fourth shadow register sr4. The context controller 120*a* may store the fourth valid value v4 as a third value in the valid register 180. The context controller 120*a* may store the fourth set value s4 as a first value in the flag register 150*a*.

Figure 7A:
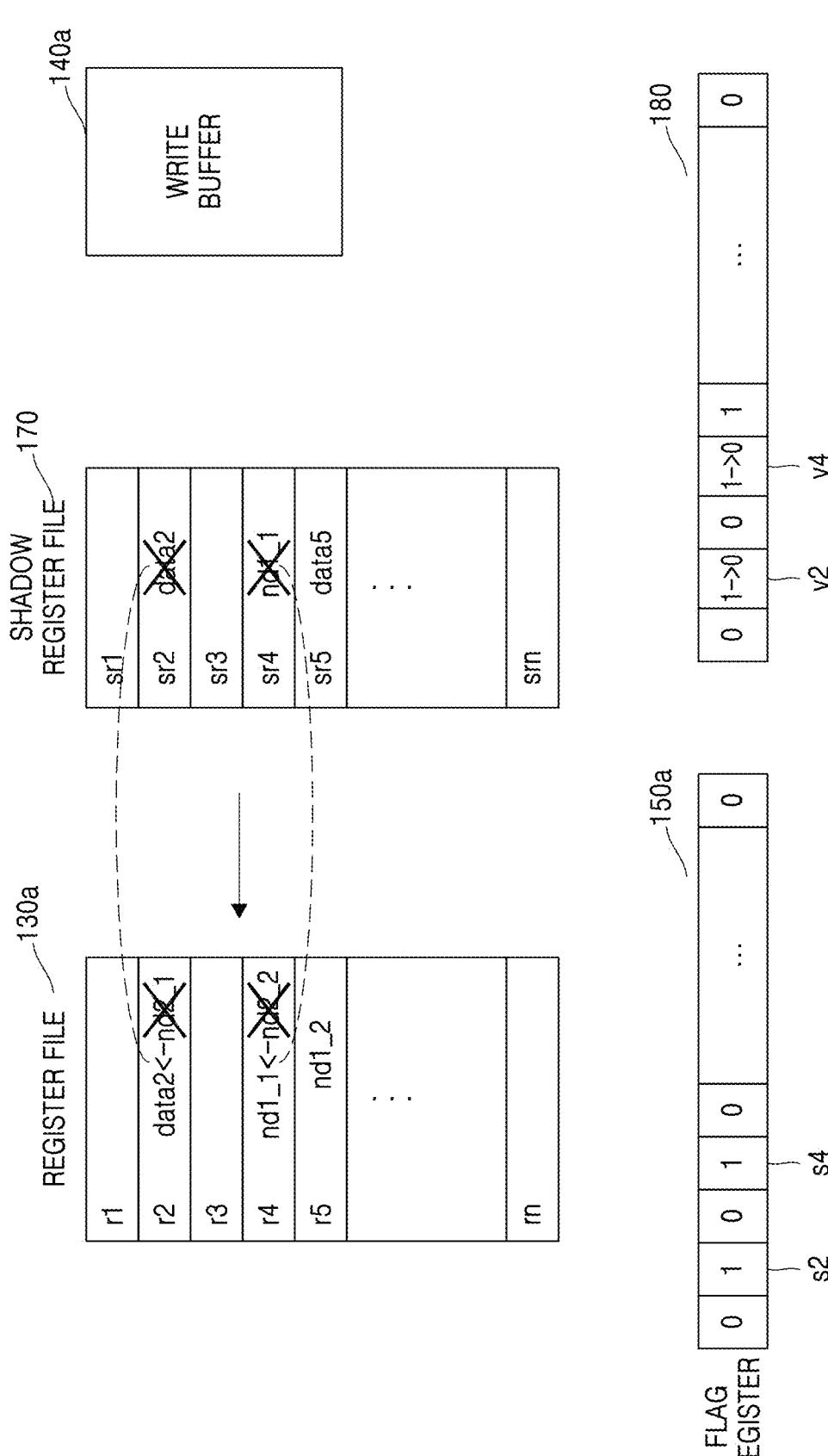
FIG. 7A is a diagram illustrating an operation of a restore controller, according to some example embodiments.

FIG. 7A is a diagram illustrating an operation of the restore controller 160*a*, according to some example embodiments. In detail, FIG. 7A is a diagram illustrating an operation of the restore controller 160*a* after the second interrupt service routine of FIG. 6C is terminated. FIG. 7A is a continuation of FIG. 6C, and the same descriptions as those given above are omitted.

Referring to FIGS. 5 and 7A, when the target interrupt service routine is terminated, the restore controller 160*a* may restore the second pre-data stored in the shadow register file to the register file, based on the set data corresponding to the target interrupt. When the second interrupt service routine is terminated, the restore controller 160*a* may restore the pre-data, based on the set data corresponding to the second interrupt.

The restore controller 160*a* may restore the pre-data, based on the set value, which is the first value. The set data corresponding to the second interrupt may include a second set value and a fourth set value that are the first values. The restore controller 160*a* may restore the second data data2 and the first new data nd1_1 stored in the second register r2 and the fourth register r4, respectively, to the shadow register file 170 in the second interrupt service routine. The second data data2 and the first new data nd1_1 may be or may include restored from the second shadow register sr2 and the fourth shadow register sr4, respectively. The restore controller 160*a* may store the second data data2 in the second register r2 and store the first new data nd1_1 in the fourth register r4.

When the second pre-data is restored to the register file 130*a*, the restore controller 160*a* may update the valid data, based on information on the shadow register in which the second pre-data is stored. Because the second pre-data of the second shadow register sr2 and the fourth shadow register sr4 is restored, the restore controller 160 may update each of the second valid value v2 and the fourth valid value v4 to the fourth value. When the pre-data is restored, the processor 100*a* may execute the first interrupt service routine from a position of the suspended first interrupt service routine.

Figure 7B:
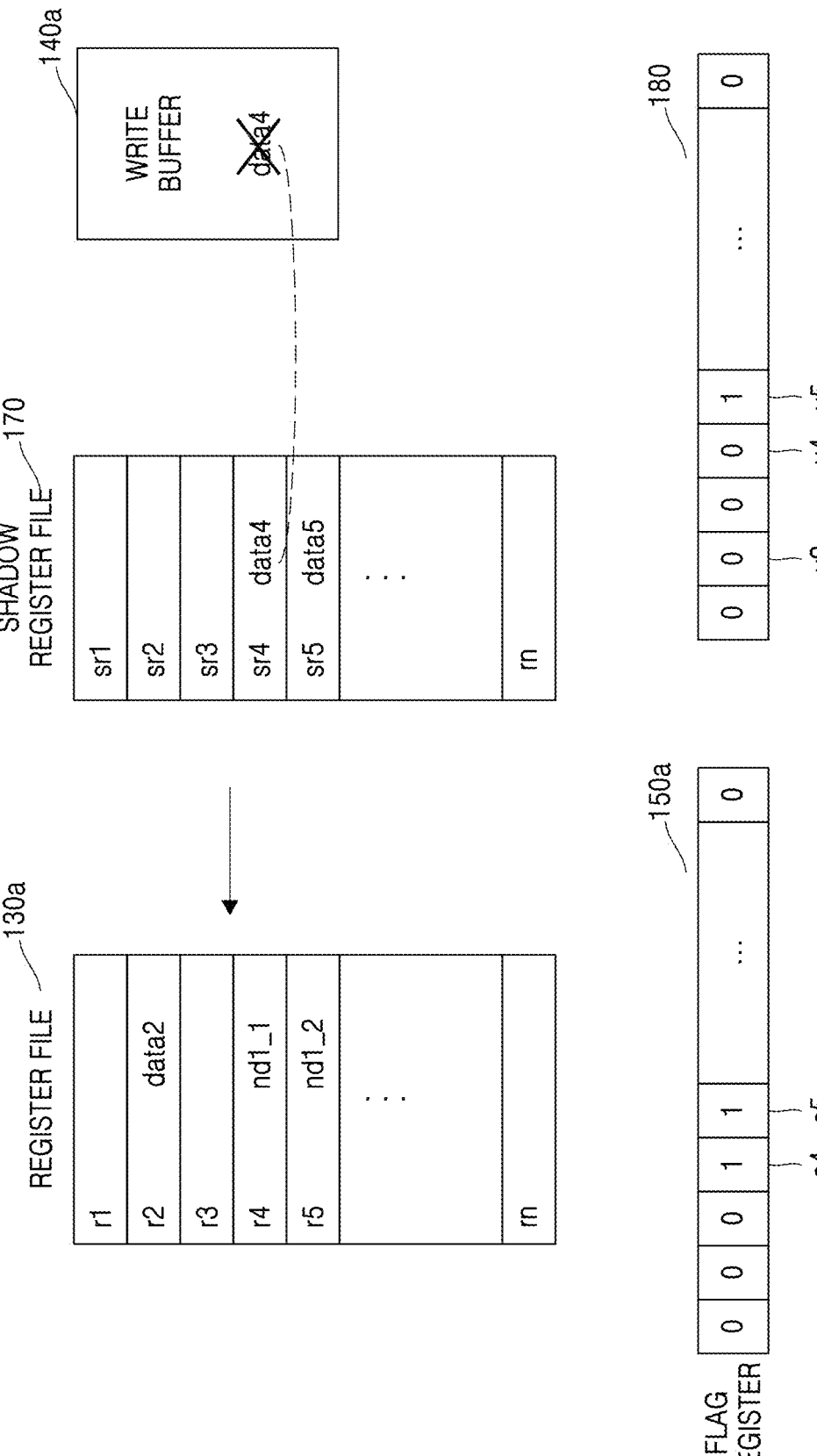
FIG. 7B is a diagram illustrating a case in which a suspended first interrupt service routine is executed, according to some example embodiments.

FIG. 7B is a diagram illustrating a case in which the suspended first interrupt service routine is executed, according to some example embodiments. In detail, FIG. 7B is a diagram illustrating an operation of the restore controller 160*a* after the second pre-data stored in the shadow register file 170 is restored to the register file 130*a* according to FIG. 7A. FIG. 7B is a continuation of FIG. 7A, and the same descriptions as those given above are omitted.

Referring to FIGS. 5 and 7B, when the second pre-data stored in the shadow register file 170 is restored to the register file 130*a*, the restore controller 160*a* may restore the first pre-data stored in the memory to the shadow register file 170, based on the updated valid data and the set data corresponding to the executed service routine before the execution of the target interrupt service routine. The restore controller 160*a* may restore the first pre-data stored in the memory to the shadow register file 170, based on the updated valid data and the set data corresponding to the first interrupt service routine executed before the execution of the second interrupt service routine. The restore controller 160*a* may read the set data corresponding to the first interrupt stored in the memory.

The set data corresponding to the first interrupt may include the fourth set value s4 and the fifth set value s5 which are the first values. The restore controller 160*a* may restore the first pre-data from the memory according to comparison between the set data and the valid data. For example, when the set value is the first value and the valid value corresponding to the set value is the fourth value, the restore controller 160*a* may restore the first pre-data stored in the shadow register corresponding to the valid value. When the set value is 1 and the valid value corresponding to the set value is 0, the restore controller 160*a* may restore the first pre-data stored in the shadow register corresponding to the valid value from the memory. Because the fourth set value s4 is 1 and the fourth valid value v4 is 0, the restore controller 160*a* may restore the fourth data data4 from the memory. The fourth data data4 may be first pre-data stored in the fourth shadow register sr4. The restore controller 160*a* may store the fourth data data4 in the fourth shadow register sr4.

In some example embodiments, the restore controller 160*a* may restore the first pre-data stored in the memory to the shadow register file 170, while the service routine executed before the target interrupt occurs is being executed. The operations described with reference to FIG. 7B may be executed, while the first interrupt service routine executed before the second interrupt occurs is re-executed. That is, while the suspended first interrupt service routine is re-executed, the restore controller 160*a* may restore the first pre-data stored in the memory to the shadow register file 170. Because the first pre-data is restored from the memory 200, while the suspended interrupt service routine is being executed, restoration time and processing time of the interrupt service routine may be reduced.

Figure 8:
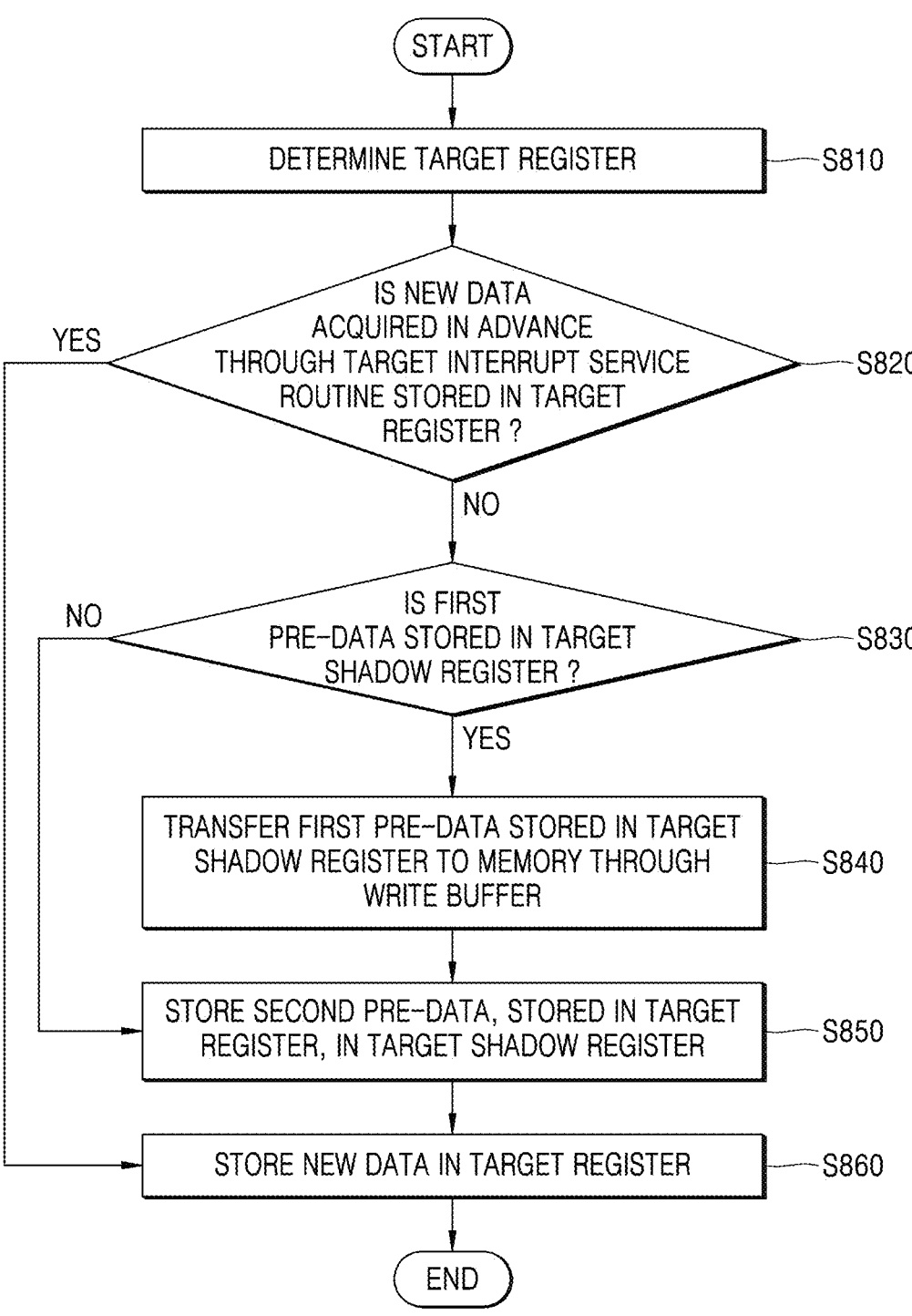
FIG. 8 is a flowchart illustrating an operating method of a processor, according to some example embodiments.

FIG. 8 is a flowchart illustrating an operating method of a processor, according to some example embodiments. In detail, the operating method of FIG. 8 may be executed by the context controller 120*a* of FIG. 5. The same descriptions as those given above are omitted.

In operation S810, when a target interrupt occurs, the processor may receive a command for executing a target interrupt service routine, and may determine a target register storing new data acquired through the command among a plurality of registers. For example, the processor may determine a target register for storing second new data acquired through a second command as the second register.

In operation S820, the processor may determine whether new data acquired in advance through the target interrupt service routine has been stored in the target register. For example, the processor may receive a first command before receiving the second command for the target interrupt service routine. When first new data acquired through the first command is stored in the second register that is the target register of the first command, the first new data may correspond to new data acquired in advance. In some example embodiments, the processor may determine whether new data acquired in advance is stored in the target register, based on the set data.

When the new data acquired in advance is stored in the target register, operation S860 may be performed, and when the new data acquired in advance is not stored in the target register, operation S820 may be performed. For example, when the first new data is stored in the second register, the processor may overwrite the second register with the second new data. When the first new data is not stored in the second register, the processor may transfer the second pre-data stored in the second register to the target shadow register and then store the second new data in the second register.

In operation S830, the processor may determine whether the first pre-data is stored in the target shadow register. The processor may determine whether the first pre-data is stored in the target shadow register based on valid data including valid values. In some example embodiments, when the valid value corresponding to the target shadow register is the third value, the processor may determine that the first pre-data is stored in the target shadow register. When the valid value corresponding to the target shadow register is the fourth value, the processor may determine that the first pre-data is not stored in the target shadow register. The processor may perform operation S840 when the first pre-data is stored in the target shadow register, and perform operation S850 when the first pre-data is not stored in the target shadow register.

In operation S840, when the first pre-data is stored in the target shadow register, the processor may transfer the first pre-data stored in the target shadow register to the memory through the write buffer.

In operation S850, the processor may store the second pre-data, stored in the target register, in the target shadow register. In operation S860, the processor may store new data in the target register.

Figure 9:
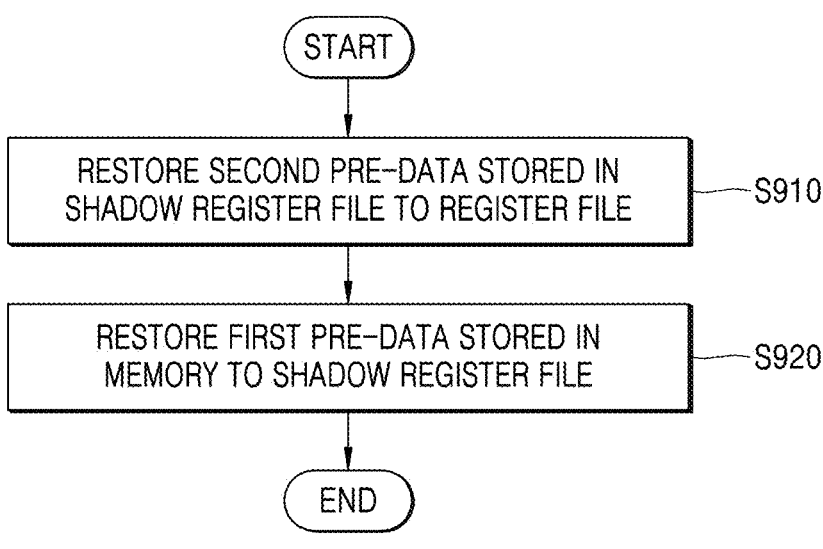
FIG. 9 is a flowchart illustrating a method of restoring data by a processor, according to some example embodiments.

FIG. 9 is a flowchart illustrating a method of restoring data by a processor, according to some example embodiments. In detail, the method of FIG. 9 may be performed by the restore controller 160a of FIG. 5. The same descriptions as those given above are omitted.

In operation S910, the processor may restore the second pre-data stored in the shadow register file to the register file. When the target interrupt service routine is terminated, the processor may restore the second pre-data stored in the shadow register file to the register file, based on the set data corresponding to the target interrupt. For example, when the second interrupt service routine is terminated, the processor may restore the second pre-data, based on the set data corresponding to the second interrupt.

The processor may restore the second pre-data stored in the register corresponding to the set value, which is the first value, from the shadow register file 170 to the register file. For example, it is assumed that the second set value and the fourth set value are the first values, and the registers corresponding to the second set value and the fourth set value are the second register and the fourth register, respectively. The processor may restore the second pre-data stored in each of the second register and the fourth register. When the second pre-data is restored, the interrupt service routine executed before the target interrupt service routine may be executed from the suspended position.

In operation S920, the processor may restore the first pre-data stored in the memory to the shadow register file. When the second pre-data is restored to the register file, the processor may restore the first pre-data stored in the memory to the shadow register file based on the updated valid data and the set data corresponding to the service routine performed before the target interrupt service routine was performed. For example, the processor may restore the first pre-data stored in the memory to the shadow register file based on the updated valid data and the set data corresponding to the first interrupt service routine performed before the second interrupt service routine was performed. When the set value is the first value and the valid value corresponding to the set value is the fourth value, the processor may restore the first pre-data stored in the shadow register corresponding to the valid value from the memory.

The processor may perform operation S920, while the service routine executed before the occurrence of the target interrupt is being executed. For example, operation S920 may be executed, while the first interrupt service routine executed before the second interrupt occurred may be re-executed. That is, while the suspended first interrupt service routine is re-executed, the processor may restore the first pre-data stored in the memory to the shadow register file. By restoring the first pre-data from the memory, while the suspended interrupt service routine is being executed, a restoration time and a processing time of the interrupt service routine may be reduced.

Figure 10:
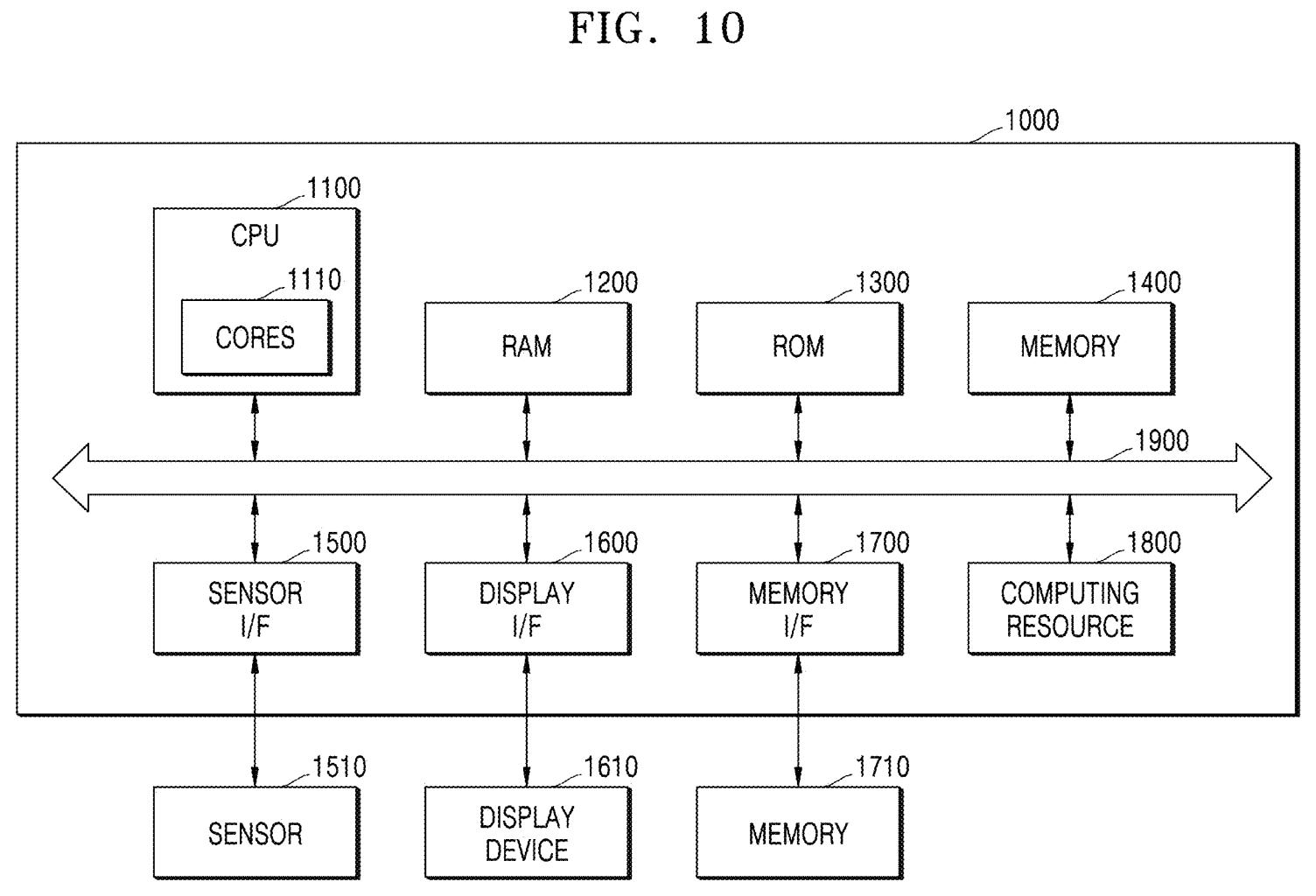

FIG. 10 is a diagram illustrating an application processor 1000 according to some example embodiments.

Referring to FIG. 10, the application processor 1000 may include a CPU 1100, a random access memory (RAM) 1200, a read-only memory (ROM) 1300, a memory 1400, a sensor interface (I/F) 1500, a display I/F 1600, a memory I/F 1700 and a computing resource 1800. In addition, the application processor 1000 may further include a communication module, and the components of the application processor 1000 may transmit and receive data to each other through a bus 1900.

The CPU 1100 may control up to overall operations of the application processor 1000. The CPU 1100 may process or execute programs and/or data stored in the memory 1400. In some example embodiments, the CPU 1100 may control functions of the application processor 1000 by executing the programs stored in the memory 1400.

The RAM 1200 may temporarily store programs, data, and/or commands. According to embodiments, the RAM 1200 may be implemented as DRAM and/or SRAM. The RAM 1200 may temporarily store data input/output through the sensor I/F 1500, the display I/F 1600, and the memory I/F 1700, and/or data generated by the computing resource 1800 or the CPU 1100.

The ROM 1300 may store continuously used programs and/or data. The ROM 1300 may be implemented as or may include an erasable programmable ROM (EPROM) and/or an electrically erasable programmable ROM (EEPROM).

The computing resource 1800 may perform computational processing on various types of data. For example, the computing resource 1800 may perform subsequent processing on data processed by the CPU 1100, perform computational processing on data stored in the memory 1400, image processing on image data received through the sensor I/F 1500, or computational processing on data received through the memory I/F 1700.

In some example embodiments, the computing resource 1800 may include n (n is a positive integer) calculation resources. The computing resource 1800 may include various computational processing devices, such as one or more of a CPU, a GPU, an AP, a digital signal processor (DSP), an FPGA, a neural network processing unit (NPU), an electronic control unit (ECU), and an image signal processor (ISP). When the computing resource 1800 is provided in plurality, the computing resources 1800 may include the same or different types of computational processing devices.

Data processed by the computing resource 1800 may be stored in the memory 1400, provided to the display device 1610 through the display interface 1600, or stored in the external memory 1710 through the memory I/F 1700.

The sensor I/F 1500 may interface data (e.g., video data, audio data, etc.) input from a sensor 1510 connected to the AP 1000.

The display interface 1600 may interface data (e.g., an image) output to the display device 1610. The display device 1610 may output image or video data through a display, such as a liquid-crystal display (LCD) or active matrix organic light emitting diode (AMOLED).

The memory I/F 1700 may interface data input from the memory 1710 present outside the AP 1000 or data output to the memory 1710. According to embodiments, the memory 1710 may be implemented as volatile memory, such as DRAM or SRAM, or non-volatile memory, such as resistance random access memory (ReRAM), phase-change random access memory (PRAM), or NAND flash. The memory 1710 may be implemented as a memory card (multimedia card (MMC), embedded MMC (eMMC), secure digital (SD), micro SD) or the like.

The CPU 1100 may correspond to the processors 100 and 100*a* according to FIGS. 1 to 9. The CPU 1100 may store data generated while executing interrupt commands in a register included in the CPU 1100. The CPU 1100 may determine whether to transfer data stored in advance in a register to a memory through a write buffer in order to store the data in the register. For example, the CPU 1100 may determine whether to transfer data stored in advance in the register to the RAM 1200 through the write buffer. The CPU 1100 may restore data stored in advance in the register. Embodiments of the CPU 1100 have been described above and are omitted here.

Any of the elements and/or functional blocks disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

While various example embodiments have been particularly shown and described with reference to embodiments thereof, it will be understood that various changes in form and details may be made therein without departing from the spirit and scope of the following claims. Additionally, example embodiments are not necessarily mutually exclusive with one another. For example, some example embodiments may include one or more features described with reference to one or more figures, and may also include one or more other features described with reference to one or more other figures.

What is claimed is:

1. A processor comprising:
   a register file including a plurality of registers configured to store data;
   a context controller that, in response to a target interrupt occurring, is configured to determine a target register that stores new data acquired through each of commands among the plurality of registers based on each of the commands for executing an interrupt service routine (ISR) for the target interrupt, and to store the new data in the target register;
   a write buffer configured to transfer pre-data stored in the target register to a memory; and
   a flag register configured to store set data including set values, the set values including a set value, the set values indicating whether the new data is stored in each of the plurality of registers,
   wherein the context controller is configured to determine whether to transfer the pre-data to the memory through the write buffer based on the set data, wherein
   in response to the new data being stored in the target register and the set value corresponding to a first value, the context controller is configured to store the new data in the target register without transferring the pre-data stored in the target register to the write buffer.

2. The processor of claim 1, wherein,
   in response to the new data being stored in the target register and the set value corresponding to a second value the context controller transfers the pre-data stored in the target register to the write buffer and stores the new data in the target register.

3. The processor of claim 1, wherein the context controller is configured to store the set value corresponding to the target register as a first value in the flag register, in response to the new data being stored in the target register.

4. The processor of claim 1, wherein the context controller is configured to store set data corresponding to the target interrupt in the memory and initializes the flag register, in response to a new interrupt occurring.

5. The processor of claim 1, wherein
   the processor further includes a restore controller configured to restore the pre-data stored in at least one of the plurality of registers before the interrupt service routine for the target interrupt is executed,
   wherein the restore controller is configured to restore the pre-data from the memory to the register file based on the set data corresponding to the target interrupt, in response to the interrupt service routine for the target interrupt being terminated.

6. The processor of claim 1, wherein
   the processor further includes:
   a shadow register file including shadow registers respectively corresponding to the plurality of registers; and
   a valid register configured to store valid data including valid values indicating whether the pre-data is stored in each of the shadow registers,
   wherein the context controller is configured to determine whether to store the pre-data in a target shadow register corresponding to the target register based on the set data.

7. The processor of claim 6, wherein the context controller is configured to determine whether to transfer the pre-data stored in the target shadow register to the memory through the write buffer based on the set data and the valid data, in response to the new data being stored in the target register.

8. The processor of claim 7, wherein the context controller is configured to transfer the pre-data stored in the target shadow register to the write buffer in response to the set value corresponding to the target register being a second value and the valid data corresponding to the target shadow register is a third value.

9. The processor of claim 6, wherein, in response to the new data being stored in the target register and the set value corresponding to the target registers being a first value, the context controller is configured to store the new data in the target register, without transferring the pre-data stored in the target register to the target shadow register, and in response to the new data being stored in the target register and the set value corresponding to the target registers being a second value the context controller is configured to transfer the pre-data stored in the target register to the target shadow register and to store the new data in the target register.

10. The processor of claim 6, wherein the processor further includes a restore controller configured to restore the pre-data stored in at least one of the plurality of registers immediately before the interrupt service routine for the target interrupt is executed, and the restore controller is configured to restore the pre-data from the shadow register file to the register file based on set data corresponding to the target interrupt, in response to the interrupt service routine for the target interrupt being terminated.

11. The processor of claim 10, wherein, in response to the pre-data being restored from the shadow register file to the register file, the restore controller is configured to restore the pre-data stored in the memory to the shadow register file based on the valid data and the set data corresponding to a service routine executed before the target interrupt occurs.

12. The processor of claim 11, wherein the restore controller is configured to restore the pre-data stored in the memory to the shadow register file, while a service routine executed before the target interrupt occurs is being executed.

13. A processor comprising:

a register file including a plurality of registers that are configured to store data;

a shadow register file including shadow registers respectively corresponding to the plurality of registers;

a context controller that, in response to a target interrupt occurring, is configured to store new data acquired through each of commands for executing a target interrupt service routine (ISR) in a target register corresponding to each of the commands among the plurality of registers; and a write buffer configured to transfer first pre-data stored in a target shadow register corresponding to the target register to a memory, wherein the context controller is configured to determine whether to store second pre-data, stored in the target register, in the target shadow register based on set data indicating whether the new data is stored in the target register, and the context controller is configured to determine whether to transfer the first pre-data to the memory through the write buffer based on the set data and valid data indicating whether the first pre-data is stored in the target shadow register.

14. The processor of claim 13, wherein, in response to the new data not being stored in the target register, the context controller is configured to store the second pre-data, stored in the target register, in the target shadow register and to store the new data in the target register.

15. The processor of claim 13, wherein, in response to the new data not being stored in the target register and the first pre-data being stored in the target shadow register, the context controller is configured to transfer the first pre-data to the memory through the write buffer.

16. The processor of claim 13, wherein the processor further includes a restore controller configured to restore the second pre-data stored in the register file, and the restore controller is configured to restore the second pre-data stored in the shadow register file to the register file based on the set data, in response to the target interrupt service routine being terminated.

17. The processor of claim 16, wherein the restore controller is configured to update the valid data go an updated valid data based on information on the shadow registers storing the second pre-data restored to the register file.

18. The processor of claim 17, wherein, in response to the second pre-data stored in the shadow register file being restored to the register file, the restore controller is configured to restore the first pre-data stored in the memory to the shadow register file based on the updated valid data and set data corresponding to a service routine executed before the target interrupt service routine is executed.

19. The processor of claim 18, wherein the restore controller is configured to restore the first pre-data stored in the memory to the shadow register file, while a service routine executed before execution of the target interrupt service routine is executed again.

20. An operating method of a processor including a plurality of registers and a plurality of shadow registers, the operating method comprising:

in response to a target interrupt occurring, receiving a command for executing a target interrupt service routine and determining a target register storing new data acquired through the command among the plurality of registers;

transferring first pre-data stored in a target shadow register among the plurality of shadow registers to a memory through a write buffer based on whether new data acquired in advance through the target interrupt service routine is stored in the target register and whether the first pre-data is stored in a target shadow register corresponding to the target register;

storing second pre-data, stored in the target register, in the target shadow register based on whether new data acquired in advance through the target interrupt service routine is stored in the target register;

storing the new data in the target register;

restoring the second pre-data stored in at least one of the plurality of shadow registers to at least one of the plurality of registers, in response to the target interrupt service routine being terminated; and restoring the first pre-data stored in the memory to at least one of the plurality of shadow registers, while a service routine executed before execution of the target interrupt service routine is executed again.

* * * * *